US009181837B2

(12) United States Patent
Kondo et al.

(10) Patent No.: US 9,181,837 B2
(45) Date of Patent: Nov. 10, 2015

(54) SECONDARY AIR SUPPLY SYSTEM FOR INTERNAL COMBUSTION ENGINE

(71) Applicants: Shinya Kondo, Gotemba (JP); Yusuke Kawamura, Shizuoka-ken (JP); Koji Umezawa, Susono (JP)

(72) Inventors: Shinya Kondo, Gotemba (JP); Yusuke Kawamura, Shizuoka-ken (JP); Koji Umezawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/370,336

(22) PCT Filed: Jan. 2, 2013

(86) PCT No.: PCT/IB2013/000071
§ 371 (c)(1),
(2) Date: Jul. 2, 2014

(87) PCT Pub. No.: WO2013/102845
PCT Pub. Date: Jul. 11, 2013

(65) Prior Publication Data
US 2014/0311131 A1 Oct. 23, 2014

(30) Foreign Application Priority Data
Jan. 4, 2012 (JP) ................................ 2012-000066

(51) Int. Cl.
| *F01N 3/00* | (2006.01) |
| *F01N 3/22* | (2006.01) |
| *F01N 9/00* | (2006.01) |
| *F01N 3/32* | (2006.01) |
| *F01N 13/00* | (2010.01) |

(52) U.S. Cl.
CPC ........ *F01N 3/22* (2013.01); *F01N 3/222* (2013.01); *F01N 3/225* (2013.01); *F01N 3/326* (2013.01); CPC ........ *F01N 9/00* (2013.01); *F01N 13/011* (2014.06); *F01N 2900/104* (2013.01); *Y02T 10/20* (2013.01); *Y02T 10/47* (2013.01)

(58) Field of Classification Search
CPC ........... F01N 3/22; F01N 3/222; F01N 3/225; F01N 3/326; F01N 13/011; F01N 9/00; F01N 2900/104; Y02T 10/20; Y02T 10/47
USPC ........................................ 60/289, 291, 293
See application file for complete search history.

(56) References Cited

U.S. PATENT DOCUMENTS 5,921,077 A * 7/1999 Bayerle et al. .................. 60/274
6,085,517 A * 7/2000 Bayerle et al. .................. 60/274

(Continued)

FOREIGN PATENT DOCUMENTS

| JP | 2005-163709 | 6/2005 |
| JP | 2006-83798 | 3/2006 |

(Continued)

*Primary Examiner* — Binh Q Tran
*Assistant Examiner* — Diem Tran
(74) *Attorney, Agent, or Firm* — Finnegan, Henderson, Farabow, Garrett & Dunner, LLP

(57) ABSTRACT

A secondary air supply system includes an electric air pump that supplies secondary air to a location upstream of an exhaust gas purification catalyst arranged in an exhaust passage; a control valve that opens/closes a secondary air supply passage; a pressure detector that detects a pressure between the pump and the control valve; and a control unit that detects a first pressure in a first operating state where the control valve is closed, and detects a second pressure in a second operating state where the control valve is open, using the pressure detector. The control unit corrects at least one of the first and second pressures based on a first driving voltage for the pump in the first operating state and a second driving voltage in the second operating state, and estimates a secondary air flow rate based on the first and second pressures after correction.

9 Claims, 14 Drawing Sheets

(56) References Cited

U.S. PATENT DOCUMENTS

| | | |
|---|---|---|
| 6,497,094 B1 * | 12/2002 | Tuleweit et al. ............... 60/289 |
| 6,666,021 B1 * | 12/2003 | Lewis et al. .................... 60/289 |
| 6,883,323 B2 * | 4/2005 | Hummel ......................... 60/606 |
| 2006/0059898 A1 | 3/2006 | Wakahara et al. |

FOREIGN PATENT DOCUMENTS

| | | |
|---|---|---|
| JP | 2008-215129 | 9/2008 |
| JP | 2010-209785 | 9/2010 |

\* cited by examiner

SECONDARY AIR SUPPLY SYSTEM FOR INTERNAL COMBUSTION ENGINE

CROSS-REFERENCE TO RELATED APPLICATIONS

This application is a national phase application of International Application No. PCT/IB2013/000071, filed Jan. 2, 2013, and claims the priority of Japanese Application No. 2012-000066, filed Jan. 4, 2012, the content of both of which is incorporated herein by reference.

BACKGROUND OF THE INVENTION

1. Field of the Invention

The invention relates to a secondary air supply system for an internal combustion engine.

2. Description of Related Art

There is known an exhaust gas control system in which an exhaust gas purification catalyst is arranged in an engine exhaust passage of an internal combustion engine and then components of carbon monoxide (hereinafter, referred to as "CO"), hydrocarbons (hereinafter, referred to as "HC") or nitrogen oxides (hereinafter, referred to as "$NO_X$") in exhaust gas are purified.

There is known a secondary air supply system in which secondary air is supplied into an exhaust pipe to increase an oxygen concentration by feeding air under pressure from an air pump to a secondary air supply passage connected to an engine exhaust passage at a portion upstream of such an exhaust gas purification catalyst and, by so doing, HC and CO in exhaust gas are oxidized, and accordingly purification of exhaust gas is facilitated. In a related art, there is suggested a secondary air supply system that is able to estimate the flow rate of secondary air that is supplied to an engine exhaust passage.

Japanese Patent Application Publication No. 2005-163709 (JP 2005-163709 A) describes a secondary air supply system that includes a control valve and a pressure sensor. The control valve is able to open and close a secondary air supply passage that is provided downstream of a pump that supplies air. The pressure sensor is arranged between the pump and the control valve. JP 2005-163709 A describes that a pressure in the secondary air supply passage is measured at the time when the control valve is open and at the time when the control valve is closed and then the flow rate of air that flows through the secondary air supply passage at the time when the control valve is open is calculated using these measured pressures.

As for a driving control device for an actuator that drives a predetermined driving target device, Japanese Patent Application Publication No. 2010-209785 (JP 2010-209785 A) describes a driving control device for an actuator. The driving control device includes: a reference voltage output unit that outputs a reference voltage; a supply voltage output unit that amplifies a voltage or a current and that outputs a supply voltage on the basis of the reference voltage; a sensor that is supplied with the supply voltage and that outputs a detected signal based on an operation amount of an operating target; and control means for calculating a correction signal by multiplying the detected signal by a value obtained by dividing the reference voltage by the supply voltage and then executing drive control over the actuator on the basis of the correction signal. JP 2010-209785 A describes that the driving control device is able to execute drive control over the actuator without receiving the influence of fluctuations in the supply voltage even when the supply voltage to the sensor fluctuates due to a high temperature.

Japanese Patent Application Publication No. 2008-215129 (JP 2008-215129 A) describes a control system for an internal combustion engine. The control system includes: an air flow meter that receives a power supply voltage from a direct-current power supply; a voltage sensor that detects the power supply voltage; and a control unit that controls a parameter that causes a change in intake air flow rate, and that controls a fuel injection amount that is supplied to an engine on the basis of a signal that indicates the intake air flow rate detected by the air flow meter. The control unit controls a throttle opening degree so as to limit the intake air flow rate in response to a decrease in the power supply voltage when the power supply voltage detected by the voltage sensor becomes lower than a first voltage. JP 2008-215129 A describes that the control system for an internal combustion engine is able to maintain engine operation close to a normal state by suppressing an error of the air flow meter even when the power supply voltage decreases.

When a secondary air supply system for an internal combustion engine is used for an extended period of time, fine particles contained in intake gas taken in from an intake system of the internal combustion engine and fine particles produced from lubricated portions and driving portions of an air pump adhere to an inner wall, or the like, of a secondary air supply passage, and accumulate as a deposit. Fine particles in exhaust gas also adhere to the inner wall, or the like, of the secondary air supply passage, and accumulate as a deposit. In this case, the pressure in the secondary air supply passage increases because the pipe resistance of the secondary air supply passage increases. When a secondary air flow rate is estimated from the pressure in the secondary air supply passage, it may be erroneously determined that the secondary air flow rate has increased due to accumulation of a deposit although the secondary air flow rate has actually decreased.

Secondary air is supplied to an exhaust system of the internal combustion engine via the secondary air supply passage by actuating an air pump. When the air pump is used for an extended period of time, a pump discharge capacity gradually decreases with aging degradation. Therefore, when the secondary air supply system is continuously used, the flow rate of air that can be supplied to an engine exhaust passage gradually decreases.

The secondary air supply system described in JP 2005-163709 A is able to estimate a secondary air flow rate in consideration of both the influence of a deposit that adheres to the inner wall of a secondary air supply pipe and a decrease in the discharge pressure of the air pump due to aging degradation.

In this secondary air supply system, the pressure in the secondary air supply passage during valve shutoff operation, that is, when the control valve arranged downstream of the air pump is closed, is detected in order to estimate the secondary air flow rate. At the time of a start of valve shutoff operation, that is, at the time when the control valve is closed, the pressure in the secondary air supply passage increases, and then becomes substantially a constant value after a lapse of a predetermined period of time.

There is a case that the secondary air supply system desirably early opens the control valve to supply secondary air to the engine exhaust passage. In this case, before the pressure in the secondary air supply passage becomes substantially constant, the control valve is opened, and secondary air is supplied to the engine exhaust passage. For example, at the time of a cold start of the internal combustion engine, it is desirable to start supplying secondary air as early as possible in order to early increase the temperature of the exhaust gas purification catalyst. It is desirable to open the control valve at the time of a transitional state before a steady state, in which the pressure in the secondary air supply passage is substantially constant, after the air pump is started. However, because a pressure is detected in the transitional state during valve shutoff operation in which the control valve is closed, when the secondary air flow rate is estimated using the detected pressure, the estimated secondary air flow rate may have an error.

When the internal combustion engine is arranged in a vehicle, or the like, an electrical load device that is an electrical load is connected to a battery. The air pump that supplies air in the secondary air supply system is the electrical load device, and is actuated by electric power that is supplied from the battery. Another electrical load device other than the air pump may be connected to the battery. When the amount of electric power that is consumed by the other electrical load device is large, the output voltage of the battery may decrease as the other electrical load device is operated. When the secondary air flow rate is detected in the case where the output voltage of the battery has decreased and accordingly the driving voltage for the air pump has decreased, the detected secondary air flow rate may have an error.

In the secondary air supply system described in JP 2005-163709 A, a transitional state at the time when such valve shutoff operation is performed, an operation state of another electrical load device, or the like, is not taken into consideration, so there is room for improvement.

SUMMARY OF THE INVENTION

The invention provides a secondary air supply system for an internal combustion engine, in which a secondary air flow rate is accurately estimated.

An aspect of the invention relates to a secondary air supply system for an internal combustion engine. The secondary air supply system includes a secondary air supply passage through which secondary air is supplied to a location upstream of an exhaust gas purification catalyst arranged in an exhaust passage of the internal combustion engine; an electric air pump that supplies secondary air into the secondary air supply passage; a control valve provided downstream of the electric air pump to open and close the secondary air supply passage; a pressure detector that measures a pressure in the secondary air supply passage at a location between the electric air pump and the control valve; a voltage detector that detects a driving voltage supplied to the electric air pump; and a control unit. The control unit is configured to detect a first pressure in the secondary air supply passage using the pressure detector in a first operating state where the control valve is closed and the electric air pump is operating, and to detect a second pressure in the secondary air supply passage using the pressure detector in a second operating state where the control valve is open and the electric air pump is operating. The control unit is configured to execute flow rate estimating control for estimating a secondary air flow rate at which secondary air flows through the secondary air supply passage in the second operating state on the basis of the first pressure and the second pressure. In the flow rate estimating control, the control unit corrects at least one of the first pressure and the second pressure on the basis of a first driving voltage for the electric air pump in the first operating state and a second driving voltage for the electric air pump in the second operating state, and estimates the secondary air flow rate on the basis of the first pressure and the second pressure at least one of which has been corrected. The control unit detects the first driving voltage and the second driving voltage using the voltage detector or detects the first driving voltage using the voltage detector and uses a preset reference driving voltage as the second driving voltage.

In the above-described aspect, the control unit may detect the first driving voltage and the second driving voltage using the voltage detector.

In the above-described aspect, the control unit may detect the first driving voltage using the voltage detector and uses the preset reference driving voltage as the second driving voltage.

In the above-described aspect, when the first driving voltage supplied to the electric air pump in the first operating state is lower than a preset determination value, the control unit may prohibit the flow rate estimating control.

In the above-described aspect, the secondary air supply system may be arranged in a vehicle that includes a storage battery that supplies electric power to the electric air pump and an electrical load device that is connected to the storage battery; the electrical load device may have a characteristic that the driving voltage for the electric air pump is decreased when the electrical load device operates; and the control unit may detect the first driving voltage in the first operating state in a period during which the electrical load device is operating, and when the first driving voltage is lower than a preset determination value, the control unit may prohibit detection of the first pressure in the period during which the electrical load device is operating.

In the above-described aspect, the secondary air supply system may be arranged in a vehicle that includes a storage battery that supplies electric power to the electric air pump and an electrical load device that is connected to the storage battery; the electrical load device may have a characteristic that the driving voltage for the electric air pump is decreased when the electrical load device operates; and the control unit may detect an operation state of the electrical load device, and when the electrical load device is operating, the control unit may prohibit detection of the first pressure.

In the above-described aspect, the secondary air supply system may be arranged in a vehicle that includes a storage battery that supplies electric power to the electric air pump and an electrical load device that is connected to the storage battery; the electrical load device may have a characteristic that the driving voltage for the electric air pump is decreased when the electrical load device operates; and the control unit may detect an operation state of the electrical load device when the first pressure should be detected, and when the electrical load device is stopped, the control unit may prohibit operation of the electrical load device until an end of detection of the first pressure.

According to the aspect of the invention, it is possible to provide a secondary air supply system for an internal combustion engine, in which a secondary air flow rate is accurately estimated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A secondary air supply system for an internal combustion engine according to a first embodiment will be described with reference to FIG. 1 to FIG. 9. The internal combustion engine in the present embodiment is arranged in a vehicle.

Figure 1:
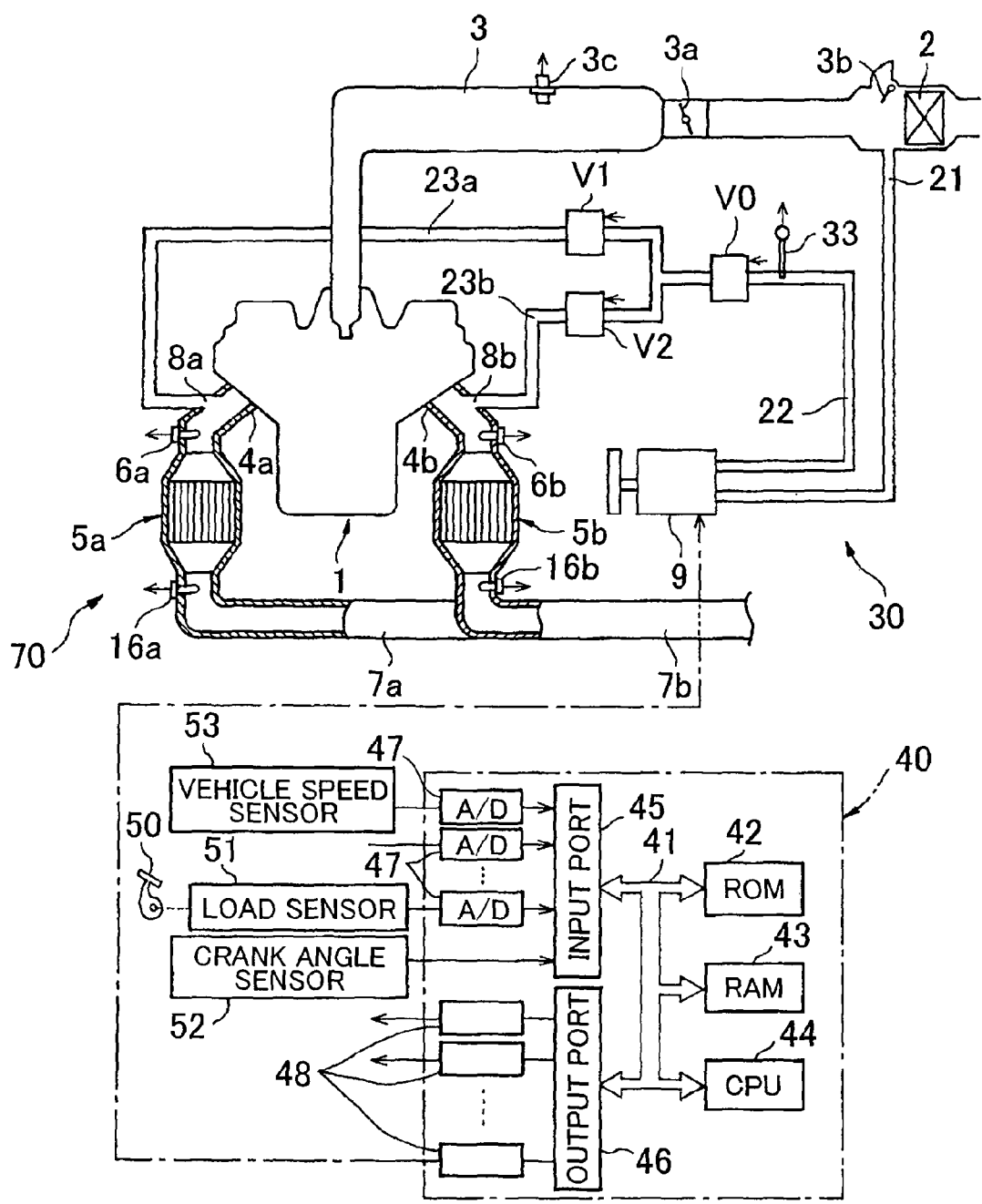
FIG. 1 is a schematic view of an internal combustion engine according to a first embodiment of the invention.

FIG. 1 is a schematic view of the internal combustion engine according to the present embodiment. The internal combustion engine in the present embodiment is a multi-cylinder V-type gasoline engine. The internal combustion engine in the present embodiment includes an engine body 1, an exhaust gas control system 70 that purifies exhaust gas, and a secondary air supply system 30. Cylinders of both right and left banks of the engine body 1 are respectively coupled to exhaust pipes 7a and 7b via mutually independent exhaust manifolds 4a and 4b. The exhaust gas control system 70 in the present embodiment includes catalytic converters 5a and 5b in each of which a catalyst having an oxidation function is supported. The catalytic converters 5a and 5b are respectively provided in the exhaust pipes 7a and 7b. Furthermore, secondary air supply ports 8a and 8b are respectively provided at the exhaust pipes 7a and 7b at locations upstream of the catalytic converters 5a and 5b. These secondary air supply ports 8a and 8b are respectively connected to two branch pipes 23a and 23b of the secondary air supply system 30 (described later).

In the exhaust pipes 7a and 7b, $O_2$ sensors 6a and 6b are respectively provided upstream of the catalytic converters 5a and 5b, and $O_2$ sensors 16a and 16b are respectively provided downstream of the catalytic converters 5a and 5b. By measuring oxygen concentrations upstream and downstream of the catalytic converters 5a and 5b, it is possible to calculate the amounts of oxygen consumed in the catalytic converters 5a and 5b.

On the other hand, a throttle valve 3a is provided in an intake pipe 3 through which intake gas is supplied to the cylinders of both right and left banks of the engine body 1. The intake pipe 3 is connected to an air cleaner 2. An air flow meter 3b is provided between the air cleaner 2 and the throttle valve 3a. The air flow meter 3b measures an air flow rate (primary air flow rate). Furthermore, a temperature sensor 3c is arranged in the intake pipe 3. The temperature sensor 3c measures an intake air temperature.

The secondary air supply system 30 includes a secondary air supply passage through which secondary air flows. The secondary air supply passage has an air intake pipe 21 that extends from a location in the intake pipe 3 between the throttle valve 3a and the air cleaner 2. The secondary air supply system 30 includes an electric air pump (AP) 9 that supplies secondary air into the secondary air supply passage. The air intake pipe 21 is connected to the electric air pump 9. The secondary air supply passage includes a secondary air supply pipe 22 that extends from the electric air pump 9. The secondary air supply pipe 22 branches into the two branch pipes 23a and 23b. These branch pipes 23a and 23b are respectively connected to the secondary air supply ports 8a and 8b of the exhaust pipes 7a and 7b.

As shown in FIG. 1, a control valve V1 is provided in the branch pipe 23a, and a control valve V2 is provided in the branch pipe 23b. A control valve V0 is provided in the secondary air supply pipe 22. In the present embodiment, the control valve V0 is arranged as a valve that opens and closes the secondary air supply passage. Any control valve may be employed as the control valve that opens and closes the secondary air supply passage. For example, the secondary air supply passage may be opened and closed by opening and closing the control valves V1 and V2.

The control valves V0, V1 and V2 each may be, for example, constituted by an air switching valve (ASV). The control valves V0, V1 and V2 control a secondary air flow rate at which secondary air flows through the branch pipes 23a and 23b and the secondary air supply pipe 22 under the control of an electronic control unit 40. The secondary air supply system 30 in the present embodiment includes a pressure sensor 33. The pressure sensor 33 serves as a pressure detector that measures the pressure in the secondary air supply passage. The pressure sensor 33 in the present embodiment is provided in the secondary air supply pipe 22 at a portion between the control valve V0 and the electric air pump 9. That is, as shown in the drawing, the pressure sensor 33 is arranged upstream of the control valve V0. The pressure detector is not limited to the pressure sensor. Any device that is able to detect an actual pressure between the electric air pump and the control valve may be employed as the pressure detector.

The electronic control unit 40 in the present embodiment is constituted by a digital computer. The electronic control unit 40 includes a read only memory (ROM) 42, a random access memory (RAM) 43, a microprocessor (CPU) 44, an input port 45 and an output port 46 that are connected to one another by a bidirectional bus 41.

As shown in FIG. 1, output signals of the $O_2$ sensors 6a and 6b respectively provided upstream of the catalytic converters 5a and 5b and output signals of the $O_2$ sensors 16a and 16b respectively provided downstream of the catalytic converters 5a and 5b are input to the input port 45 via corresponding AD converters 47. An output signal of the air flow meter 3b is also input to the input port 45 via a corresponding AD converter 47. In addition, an output signal of the pressure sensor 33 provided in the secondary air supply pipe 22 is also input to the input port 45 via a corresponding AD converter 47. Furthermore, an output signal of the temperature sensor 3c provided in an intake passage and an output signal of a temperature sensor (not shown) for engine coolant are also input to the input port 45 via corresponding AD converters 47.

A load sensor 51 is connected to an accelerator pedal 50. The load sensor 51 generates an output voltage that is directly proportional to a depression amount L of the accelerator pedal 50. The output voltage of the load sensor 51 is input to the input port 45 via a corresponding AD converter 47. In addition, a crank angle sensor 52 is connected to the input port 45. The crank angle sensor 52 generates an output pulse each time a crankshaft rotates, for example, 30°. Furthermore, an output pulse, that indicates a vehicle speed is input from a vehicle speed sensor 53 to the input port 45.

On the other hand, the output port 46 is connected to a fuel injection valve (not shown) of the engine body 1, a stepping motor (not shown) that is used to control the throttle valve 3a, the control valves V0, V1 and V2 and electric air pump 9 of the secondary air supply system 30 via corresponding drive circuits 48.

Exhaust gas purification catalysts that have an oxidation function are respectively arranged in the catalytic converters 5a and 5b of the exhaust gas control system 70 in the present embodiment. An oxidation catalyst, a three-way catalyst or an $NO_X$ storage-reduction catalyst may be used as each of the exhaust gas purification catalysts that have an oxidation function. The $NO_X$ storage-reduction catalyst releases stored $NO_X$ and reduces (purifies) $NO_X$. Note that the $NO_X$ storage-reduction catalyst has the function of releasing $NO_X$ when an average air-fuel ratio in combustion chambers becomes rich. The $NO_X$ storage-reduction catalyst is, for example, formed as follows. Alumina is used as a carrier, and a precious metal, such as platinum Pt, and at least one selected from a group consisting of alkali metals, such as potassium K, lithium Li and cesium Cs, alkaline earths, such as barium Ba and calcium Ca, and rare earths, such as lanthanum La and yttrium Y, are supported on the carrier.

The secondary air supply system 30 in the present embodiment is used mainly in a situation, for example, at the time of a cold start, that a fuel concentration is high, an air-fuel ratio is small and the temperatures of the catalytic converters 5a and 5b of the exhaust gas control system 70 are not sufficiently increased and, therefore, the function thereof is not sufficiently exhibited. By supplying secondary air to the catalytic converters 5a and 5b, oxygen concentrations in the catalytic converters 5a and 5b increase, so the catalytic converters 5a and 5b increase in temperature through oxidation reaction. Thus, it is possible to improve an ability to purify (convert) co, HC, $NO_X$, and the like, in exhaust gas.

Figure 2:
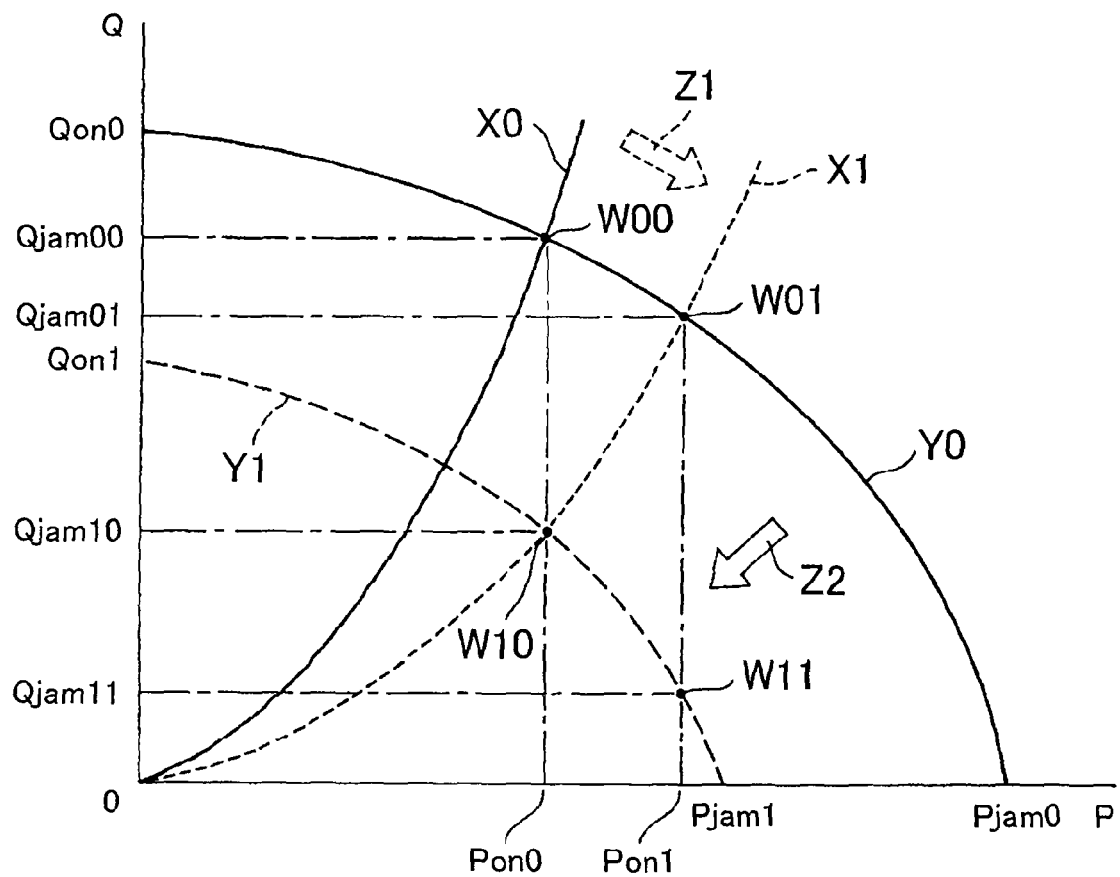
FIG. 2 is a graph that illustrates the relation between a pressure and a secondary air flow rate in a secondary air supply pipe of a secondary air supply system according to the first embodiment.

FIG. 2 is a graph that shows the relation between a pressure of secondary air and a flow rate of secondary air in the secondary air supply pipe of the secondary air supply system 30 according to the present embodiment. In the present embodiment, in the secondary air supply system, secondary air supply control (in the following description and drawings, referred to as "AI") is executed for supplying secondary air into an engine exhaust passage. More specifically, the electronic control unit 40 included in the secondary air supply system is configured to execute the AI. Here, when AI is being executed, both the downstream-side control valves V1 and V2 are open and the upstream-side control valve V0 is also open, and the electric air pump 9 is operated, so secondary air is supplied to the catalytic converters 5a and 5b. On the other hand, when AI is stopped, the electric air pump 9 stops, and all the upstream-side control valve V0 and the downstream-side control valves V1 and V2 are closed, so supply of secondary air is stopped.

In the present embodiment, a state where the control valve is closed and the electric air pump is operated is termed first operating state. For example, a state where the control valve V0 is closed and the electric air pump 9 is operated corresponds to the first operating state. That is, a state where valve shutoff operation is performed is the first operating state. The pressure in the secondary air supply passage at a portion between the control valve and the electric air pump, which has been detected in the first operating state, is termed first pressure Pjam.

On the other hand, a state where the control valve is open and the electric air pump is operated is termed second operating state. For example, a state where the control valves V0, V1 and V2 are open and the electric air pump 9 is operated is the second operating state. That is, a state where AI is executed and secondary air is supplied into the engine exhaust passage is the second operating state. In addition, the pressure in the secondary air supply passage at the portion between the control valve and the electric air pump, which has been detected in the second operating state, is termed second pressure Pon.

In FIG. 2, the ordinate axis represents a secondary air flow rate Q in the secondary air supply pipe, and the abscissa axis represents a pressure P of secondary air in the secondary air supply pipe. In the secondary air supply system in the present embodiment, flow rate estimating control is executed to estimate a secondary air flow rate Qjam at which secondary air flows through the secondary air supply passage during execution of AI. More specifically, the electronic control unit 40 included in the secondary air supply system is configured to execute the flow rate estimating control. Hereinafter, estimation of an actual flow rate Qjam of secondary air during execution of AI will be described with reference to FIG. 2.

The relation between the pressure P and flow rate Q of secondary air in the secondary air supply passage is substantially drawn in an exponential manner as indicated by the solid line X0 in FIG. 2. That is, the flow rate Q exponentially increases as the pressure P increases. However, when a deposit accumulates on an inner wall of the secondary air supply pipe 22, or the like, and pipe resistance increases, the flow rate Q reduces even at the same pressure P, so the relation between a pressure P and a flow rate Q shifts in a direction indicated by a broken-line arrow Z1. For example, when it is assumed that the solid line X0 indicates a state where no deposit accumulates on the inner wall of the secondary air supply pipe 22, or the like, the pipe resistance of the secondary air supply pipe 22, or the like, increases as a deposit accumulates. Thus, the solid line X0 shifts to, for example, a broken line X1 in the direction indicated by the broken-line arrow Z1.

On the other hand, when the flow rate Q at the time when the degree of closing of the secondary air supply pipe 22 is changed by the control valve V0 while the electric air pump 9 is operating is considered, the pressure P is maximum when the control valve V0 is fully closed, and the flow rate Q becomes zero. When the control valve V0 is fully open, the flow rate Q is maximum, and the pressure P is close to zero. When the control valve V0 is half-closed, each of the flow rate Q and the pressure P is at the midpoint between the value at the time when the control valve V0 is fully open and the value at the time when the control valve V0 is fully closed.

Thus, when the control valve V0 is gradually changed from a state where the control valve V0 is fully open to a state where the control valve V0 is fully closed while the electric air pump 9 is operating, the relation between a pressure P and a flow rate Q indicated by a P-Q characteristic curve Y0 shown in FIG. 2 is obtained. Here, the intersection between the P-Q characteristic curve Y0 and an X axis is a pressure Pjam0 at the time of valve shutoff operation, and the intersection between the P-Q characteristic curve Y0 and a Y axis is a flow rate Qon0. When it is assumed that the P-Q characteristic curve Y0 is a P-Q characteristic curve that is obtained at the time when there is no aging degradation of the electric air pump 9, the intersection Pjam0 between the P-Q characteristic curve Y0 and the X axis is the maximum value of the pressure Pjam at the time of valve shutoff operation, which is obtained at the time when the electric air pump 9 is operated while the control valve V0 is closed. The flow rate Qon0 at the intersection between the P-Q characteristic curve Y0 and the Y axis is a theoretical maximum value of the flow rate Qon that is obtained at the time when the electric air pump 9 is operated while the control valve V0 is fully open.

The theoretical flow rate Q at the time when the control valve V0 is open is the flow rate Qon0 shown in FIG. 2; however, there is actually a pressure loss, or the like, of a pipeline. Therefore, even when there is no increase in the pipe resistance of the secondary air supply pipe 22, or the like, the relation between a pressure P and a flow rate Q indicated by the solid line X0 is obtained.

The discharge capacity of the electric air pump 9 gradually decreases with aging degradation. As the discharge capacity of the electric air pump 9 decreases, both the pressure Pjam at the time of valve shutoff operation while the control valve V0 is closed and the flow rate Qon while the control valve V0 is open are respectively smaller than the pressure Pjam0 and the flow rate Qon0 at the time of valve shutoff operation, shown in FIG. 2. That is, as shown in FIG. 2, as the discharge capacity of the electric air pump 9 decreases, the P-Q characteristic curve Y0 gradually shifts in a direction indicated by a solid-line arrow Z2 to, for example, another P-Q characteristic curve Y1 indicated by broken line.

Here, the case where there is neither an increase in the pipe resistance of the secondary air supply pipe. 22, or the like, nor a decrease in the discharge capacity of the electric air pump 9, that is, for example, the case where almost no period of time has elapsed from a start of usage of the secondary air supply system 30, will be considered. In this case, it is assumed that the pressure Pon0 at the time of execution of AI is obtained by operating the electric air pump 9 while the control valve V0 is open and the pressure Pjam0 at the time of valve shutoff operation is obtained by operating the electric air pump 9 while the control valve V0 is closed. When the pressure Pjam0 at the time of valve shutoff operation is obtained, the P-Q characteristic curve Y0, which passes through the pressure Pjam0 at the time of valve shutoff operation in the case where there is neither an increase in the pipe resistance of the secondary air supply pipe 22, or the like, nor a decrease in the discharge capacity of the electric air pump 9, is determined.

Subsequently, as is apparent from FIG. 2, an actual flow rate Qjam00 at the time of execution of AI is determined from the Y coordinate of an intersection W00 between a perpendicular that passes through the pressure Pon0 at the time of execution of AI and the P-Q characteristic curve Y0. The flow rate Qjam00 is a flow rate Q at the time of execution of AI in the case where there is neither an increase in the pipe resistance of the secondary air supply pipe 22, or the like, nor a decrease in the discharge capacity of the electric air pump 9, so the flow rate Qjam00 is a maximum flow rate that can be actually obtained at the time of execution of AI.

Next, the case where there is no increase in the pipe resistance of the secondary air supply pipe 22, or the like, but the discharge capacity of the electric air pump 9 is decreased due to aging degradation will be considered. In this case, the pipe resistance of the secondary air supply pipe 22, or the like, is not increased, so the pressure Pon at the time of execution of AI remains at the pressure Pon0 shown in FIG. 2. However, because the discharge capacity of the electric air pump 9 is decreased, the pressure Pjam at the time of valve shutoff operation when the electric air pump 9 is operated while the control valve V0 is closed is lower than the maximum pressure Pjam0 at the time of valve shutoff operation, and, for example, the pressure Pjam at the time of valve shutoff operation is a pressure Pjam1 at the time of valve shutoff operation as shown in FIG. 2. The new pressure Pjam1 at the time of valve shutoff operation is obtained, so the P-Q characteristic curve Y1 that passes through the pressure Pjam1 at the time of valve shutoff operation is determined. The P-Q characteristic curve Y1 is selected from among a plurality of P-Q characteristic curves Y obtained in advance through an experiment, or the like.

Subsequently, an actual flow rate Qjam10 at the time of execution of AI is obtained from the Y coordinate of an intersection W10 between a perpendicular that passes through the pressure Pon0 at the time of execution of AI and the P-Q characteristic curve Y1. Naturally, the actual flow rate Qjam10 at the time when the discharge capacity of the electric air pump 9 is decreased is smaller than the flow rate Qjam00.

Furthermore, the case where the discharge capacity of the electric air pump 9 is not changed but a deposition accumulates on the inner wall of the secondary air supply pipe 22, or the like, and the pipe resistance is increased is considered. Because the discharge capacity of the electric air pump 9 is not changed, the pressure Pjam at the time of valve shutoff operation remains at the maximum pressure Pjam0 at the time of valve shutoff operation. Thus, the P-Q characteristic curve Y0 that passes through the pressure Pjam0 at the time of valve shutoff operation is employed. Subsequently, when the control valve V0 is open and the electric air pump 9 is operating, that is, at the time of execution of AI, a pressure higher than the pressure Pon0, for example, the pressure Pon1, is obtained because the pipe resistance is increased. Note that the pressure Pon1 is naturally lower than the maximum pressure Pjam0 at the time of valve shutoff operation. An actual flow rate Qjam01 at the time of execution of AI is obtained from the Y coordinate of an intersection W01 between the P-Q characteristic curve Y0 at the time when the discharge capacity of the electric air pump 9 is not decreased and a perpendicular that passes through the pressure Pon1. Naturally, the flow rate Qjam01 is smaller than the flow rate Qjam00.

Next, the case where the pipe resistance of the secondary air supply pipe 22, or the like, is increased and the discharge capacity of the electric air pump 9 is decreased will be considered. For a reason similar to that described above, the pressure Pon at the time of execution of AI is a pressure higher than the pressure Pon0, for example, the pressure Pon1, and the pressure Pjam at the time of valve shutoff operation is a pressure lower than the maximum pressure Pjam0 at the time of valve shutoff operation, for example, the pressure Pjam1 at the time of valve shutoff operation. As in the above-described case, an actual flow rate Qjam11 at the time of execution of AI is calculated from the Y coordinate of an intersection W11 between the P-Q characteristic curve Y1 that passes through the pressure Pjam1 at the time of valve shutoff operation and a perpendicular that passes through the pressure Pon1. Naturally, the flow rate Qjam11 in the case where the pipe resistance of the secondary air supply pipe 22, or the like, is increased and the discharge capacity of the electric air pump 9 is decreased is smaller than the flow rate Qjam00, the flow rate Qjam01 and the flow rate Qjam10 shown in FIG. 2.

In the secondary air supply system according to the present embodiment, it is possible to obtain the accurate flow rate Qjam11 because a decrease in the discharge capacity of the electric air pump 9 and an increase in the pipe resistance of the secondary air supply pipe 22, or the like, are taken into consideration.

The description is made on the case where the pressure Pjam at the time of valve shutoff operation is decreased to the pressure Pjam1 at the time of valve shutoff operation due to a decrease in the discharge capacity of the pump and/or the case where the pressure Pon at the time of execution of AI is increased to the pressure Pon1 due to an increase in the pipe resistance of the secondary air supply pipe 22. It is apparent that the pressure Pjam at the time of valve shutoff operation and the pressure Pon vary depending on the degree of decrease in the discharge capacity of the electric air pump 9 and/or the degree of increase in the pipe resistance of the secondary air supply pipe 22 and then a different P-Q characteristic curve Y is used each time. Thus, in FIG. 2, the flow rate reduces in order of the flow rate Qjam01, the flow rate Qjam10 and the flow rate Qjam11; however, the order of these flow rate in magnitude may vary depending on the degree of decrease in the discharge capacity of the electric air pump 9 and/or the degree of increase in the pipe resistance.

In the secondary air supply system according to the present embodiment, it is possible to calculate an actual flow rate Qjam at the time of execution of AI after the degree of increase in the pipe resistance of the secondary air supply pipe 22 and the degree of decrease in the discharge capacity of the electric air pump 9 are determined on the basis of the pressure Pon obtained when the control valve V0 is open and the electric air pump 9 is operating, that is, at the time of execution of AI, and the pressure Pjam at the time of valve shutoff operation. Therefore, it is possible to calculate an actual flow rate Qjam at the time of execution of AI more accurately as compared to when these two elements are not taken into consideration. Note that in the secondary air supply system according to the present embodiment, it is possible to determine the degree of decrease in the discharge capacity of the electric air pump 9 on the basis of the pressure Pjam at the time of valve shutoff operation, which is obtained when the control valve V0 is closed and the electric air pump 9 is operating. For example, when the pressure Pjam at the time of valve shutoff operation is lower than a preset determination value, it may be determined that the electric air pump 9 is degraded.

Figure 3:
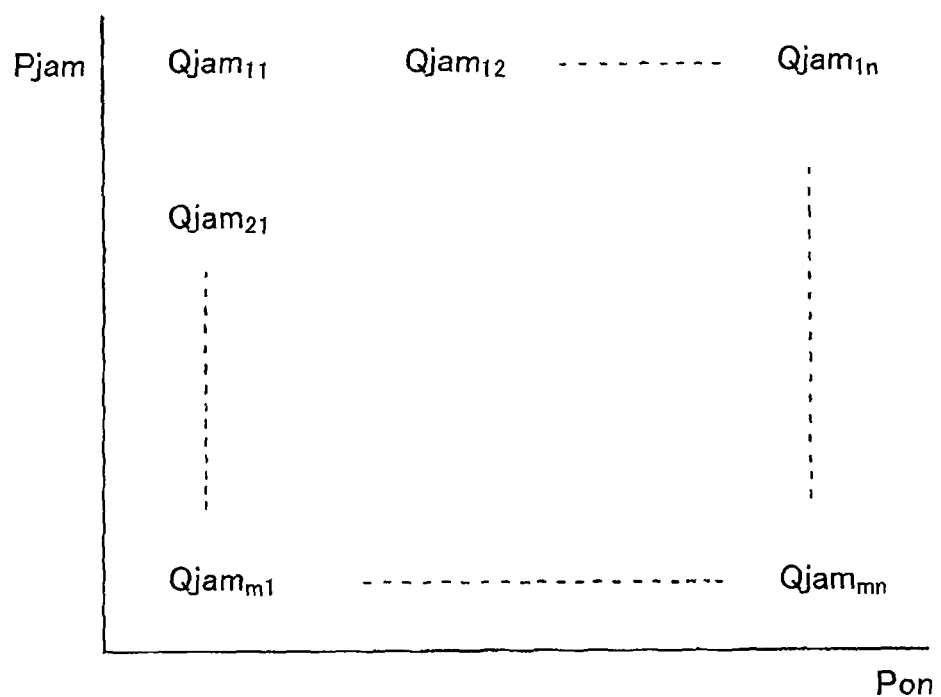
FIG. 3 is a map of a secondary air flow rate Qjam as a function of a first pressure Pjam and a second pressure Pon according to the first embodiment.

As shown in FIG. 2, the flow rate Qjam may be calculated on the basis of the P-Q characteristic curve Y obtained in advance, for example, the P-Q characteristic curve Y1. Instead, for example, as shown in FIG. 3, an actual flow rate Qjam at the time of execution of AI may be stored in the ROM in form of a map as a function of the pressure Pon at the time of execution of AI and the pressure Pjam at the time of valve shutoff operation. In this case, it is possible to directly obtain an actual flow rate Qjam at the time of execution of AI without performing the above-described computation.

Thus, in the secondary air supply system according to the present embodiment, the first pressure Pjam in the secondary air supply passage is detected using the pressure detector in the first operating state where the control valve is closed and the electric air pump is operating, and the second pressure Pon in the secondary air supply passage is detected using the pressure detector in the second operating state where the control valve is open and the electric air pump is operated. It is possible to execute flow rate estimating control for estimating the secondary air flow rate Qjam, at which secondary air flows through the secondary air supply passage when the control valve is open and the electric air pump is operating, using the first pressure and the second pressure.

Figure 4:
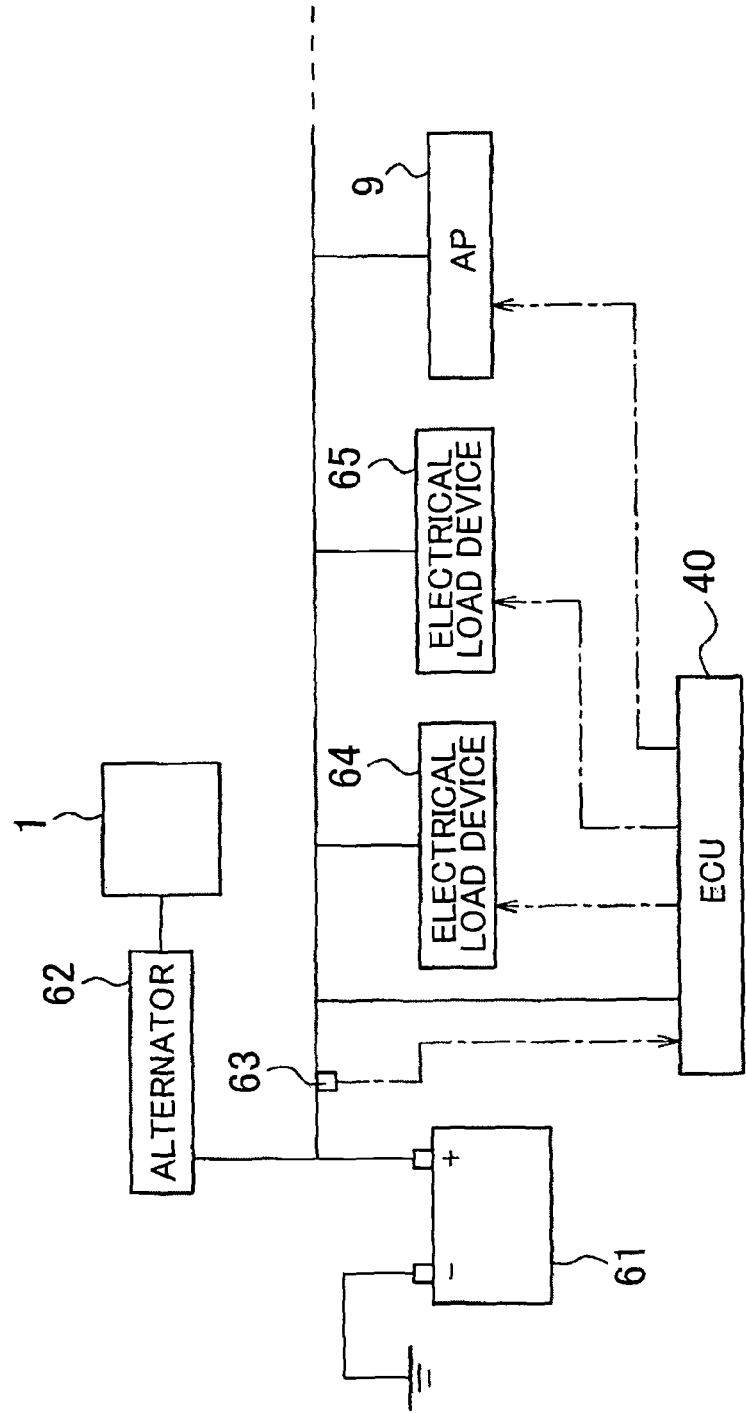
FIG. 4 is a schematic view of electrical load devices that are connected to a battery in a vehicle according to the first embodiment.

FIG. 4 shows a schematic view that illustrates electrical loads that are connected to a battery of the vehicle in the present embodiment. The vehicle in the present embodiment includes the battery 61 that serves as a storage battery. Any device that is able to store electricity may be employed as the storage battery.

An alternator 62 is connected to the battery 61. The alternator 62 in the present embodiment is connected to the engine body 1. The torque of the crankshaft of the engine body 1 is transmitted to the alternator 62. Electric power is generated by the alternator 62, and the battery 61 is charged.

The electric air pump 9 is electrically connected to the battery 61 in the present embodiment. Other electrical load devices 64 and 65, and the like, which are different from the electric air pump 9, are connected to the battery 61. Electric power is also supplied from the battery 61 to the electrical load devices 64 and 65, and the like. In the present embodiment, the output voltage of the battery 61 is equivalent to a driving voltage that is supplied to each of the electrical load devices 64 and 65, and the like. The output voltage of the battery 61 is detected by a voltage sensor 63 that functions as a voltage detector. The voltage sensor 63 in the present embodiment detects the driving voltage for the electric air pump 9. An output of the voltage sensor 63 is input to the electronic control unit 40. Each of the electrical load devices 64 and 65 is controlled by the electronic control unit 40.

Figure 5:
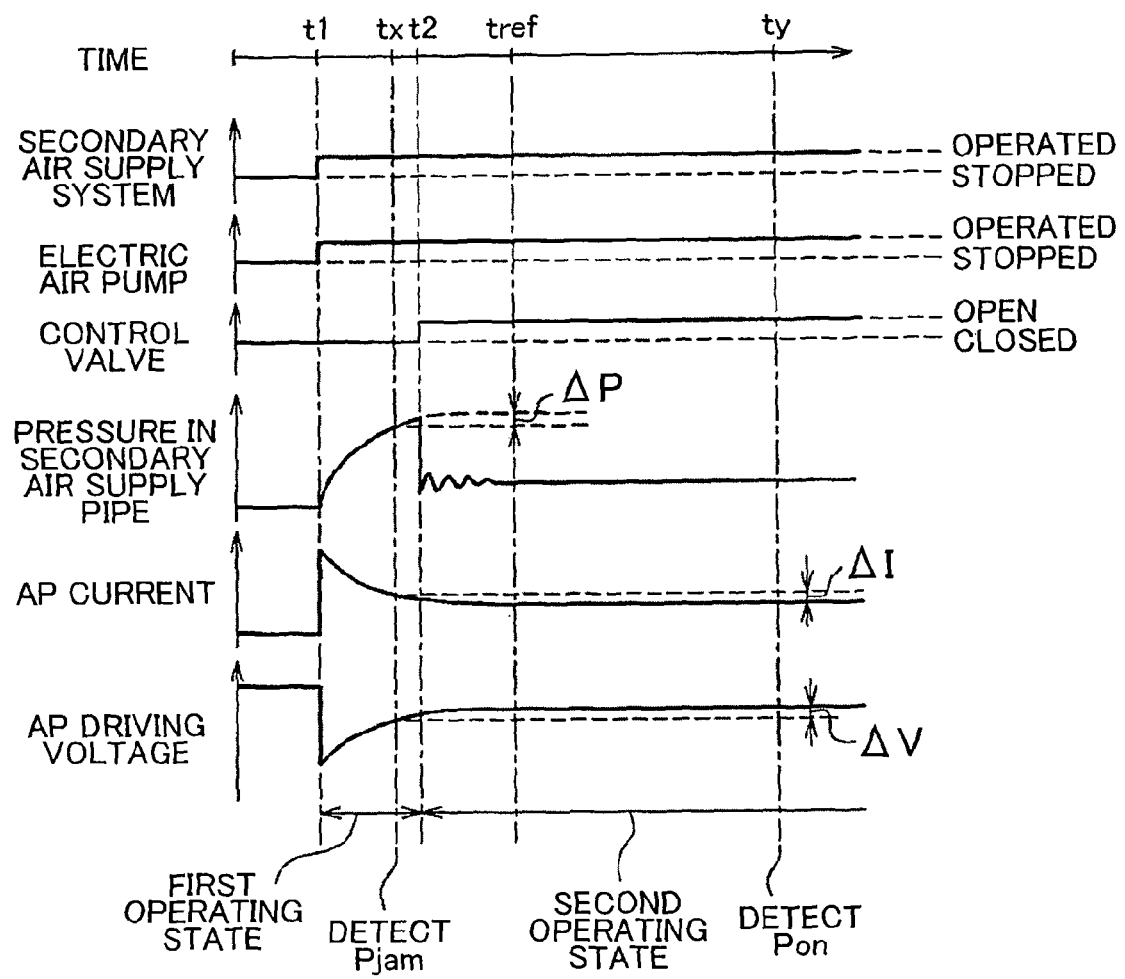
FIG. 5 is a time chart at the time when the secondary air supply system is started according to the first embodiment.

FIG. 5 shows a time chart at the time of executing flow rate estimating control for estimating the flow rate of secondary air in the present embodiment. FIG. 5 is a time chart at the time of starting the secondary air supply system in the present embodiment. The secondary air supply system in the present embodiment is started immediately after a start of the engine body 1.

At time t1, an operation signal for the secondary air supply system is transmitted, and the secondary air supply system is started. At time t1, the electric air pump 9 is started. The control valve V0 is closed, and the secondary air supply pipe 22 between the electric air pump 9 and the control valve V0 is in a shutoff state. The secondary air supply system is placed in the first operating state in which valve shutoff operation is performed.

In the first operating state, the pressure inside the secondary air supply pipe 22 starts to increase. Because the electric air pump 9 in the present embodiment has a large electrical load, the output voltage of the battery 61 decreases when the electric air pump 9 is started. For this reason, the driving voltage that is supplied to the electric air pump 9 decreases. A current value of the electric air pump 9 instantaneously increases at a start of the electric air pump 9 and, after that, gradually decreases. After a lapse of a predetermined period of time, the current value of the electric air pump 9 becomes substantially a constant current value. The driving voltage for the electric air pump 9 instantaneously decreases when the electric air pump 9 is started, and, after that, gradually increases. After a lapse of a predetermined period of time, the driving voltage for the electric air pump 9 becomes substantially a constant driving voltage.

At time t2, the control valve V0 is opened, and secondary air is supplied into the engine exhaust passage. The pressure in the secondary air supply pipe 22 instantaneously decreases at time t2, and, after that, becomes substantially constant at a predetermined pressure. The secondary air supply system is placed in the second operating state in which AI is being executed.

Referring to the pressure in the secondary air supply pipe, the pressure increases as a result of a start of the electric air pump, and the control valve V0 is opened before the pressure becomes substantially constant. In the secondary air supply system, it is desirable that a period of time after transmission of the operation signal until actual supply of secondary air into the engine exhaust passage be short. For example, when the secondary air supply system is operated at the time of a cold start of the internal combustion engine, it is possible to increase the temperature of each exhaust gas purification catalyst to a desired temperature higher than or equal to an activation temperature in a short period of time by advancing the time at which supply of secondary air is started. Therefore, it is possible to improve the exhaust gas purification ability of the exhaust gas control system in a short period of time.

In the secondary air supply system in the present embodiment, the first pressure Pjam is detected in the first operating state where the control valve V0 is closed in order to estimate the secondary air flow rate. In the present embodiment, the first pressure Pjam is detected at time tx. Time tx is prior to time t2 at which the control valve V0 is opened. The first pressure Pjam is detected in a period during which the pressure in the secondary air supply pipe is increasing. In other words, the first pressure Pjam is detected in a period during which the driving voltage that is supplied to the electric air pump 9 is increasing. That is, at the time of detecting the first pressure Pjam, the secondary air supply system is in a transitional state.

In order to estimate the secondary air flow rate, the second pressure Pon is detected at time ty in the second operating state where the control valves V0, V1 and V2 are open. At time ty, the second pressure Pon is detected in a state where the pressure in the secondary air supply pipe and the current and driving voltage that are supplied to the electric air pump are substantially constant. At the time of detecting the second pressure Pon, the secondary air supply system is in a steady state.

In an operation example shown in FIG. 5, there is a voltage difference ΔV between the driving voltage for the electric air pump 9 at time tx at which the first pressure Pjam is detected and the driving voltage for the electric air pump 9 at time ty at which the second pressure Pon is detected. In addition, there is a current difference ΔI between the current supplied to the electric air pump 9 at time tx and the current supplied to the electric air pump 9 at time ty.

When the first pressure Pjam is detected while the driving voltage is increasing, the detected first pressure Pjam is lower than the first pressure Pjam in a steady state of the secondary air supply system. For example, when the first pressure Pjam is detected in a steady state where the driving voltage for the electric air pump 9 is substantially constant as in the case at time tref, the driving voltage for the electric air pump 9 at the time when the first pressure Pjam is detected is substantially equal to the driving voltage for the electric air pump 9 at the time when the second pressure Pon is detected. However, in the present embodiment, because there is the voltage difference ΔV between the driving voltage at the time when the pressure is detected at time tx and the driving voltage at the time when the pressure is detected at time ty, the pressure that is detected at time tx is lower by a pressure difference ΔP than the pressure that is detected in a steady state at time tref. Thus, in the secondary air supply system in the present embodiment, flow rate estimating control is executed for correcting an error of the pressure, which arises due to a difference in driving voltage for the electric air pump, and then estimating the secondary air flow rate.

Figure 6A:
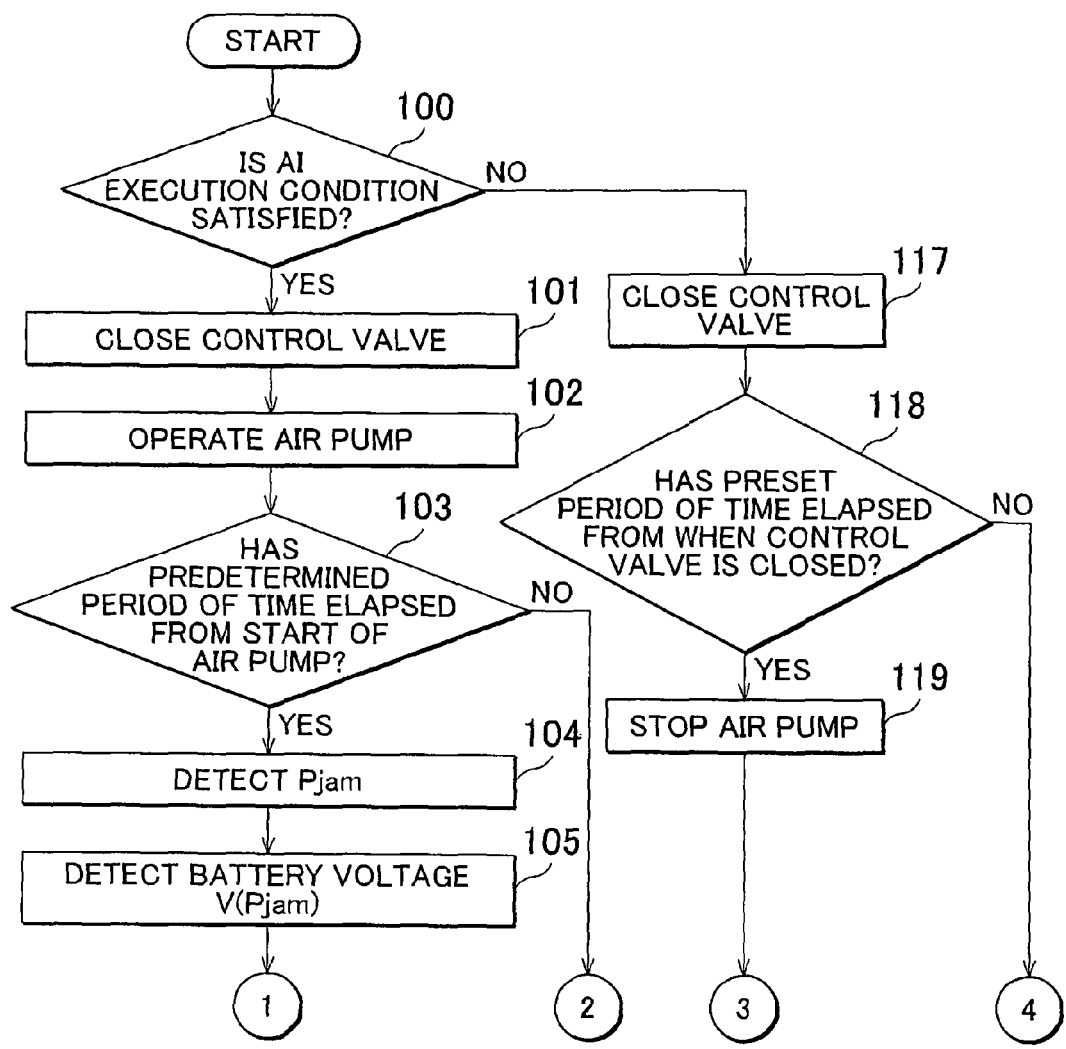
FIGS. 6A and 6B show a flowchart of flow rate estimating control for estimating a secondary air flow rate according to the first embodiment.
Figure 6B:
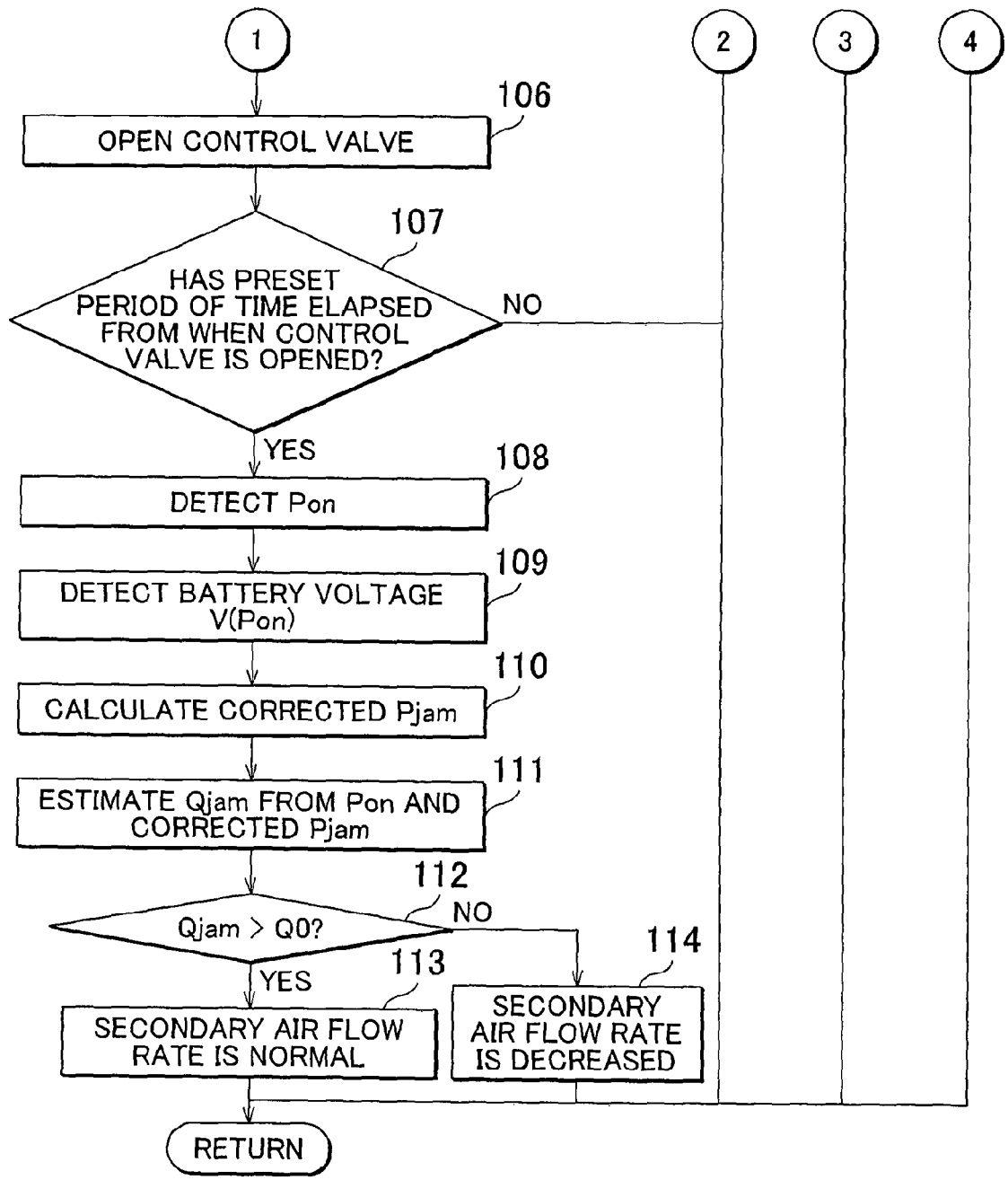

FIGS. 6A and 6B show a flowchart of the flow rate estimating control according to the present embodiment. The flow rate estimating control shown in FIGS. 6A and 6B may be, for example, executed at preset time intervals.

In step 100, it is determined whether a condition for executing AI is satisfied. That is, it is determined whether a condition for supplying secondary air into the engine exhaust passage is satisfied. The condition for supplying secondary air may be determined on the basis of a state of the internal combustion engine, such as an engine coolant temperature, an intake air temperature, an elapsed time after a start of the engine body, an output voltage of the battery, an engine rotation speed and an engine load. For example, when a sufficient period of time has elapsed after a start of the engine body and the exhaust gas purification catalysts are kept at or above an activation temperature, it is not necessary to operate the secondary air supply system. In this case, it is determined that the condition for supplying secondary air is not satisfied. In addition, there is a case where the electric power supply capacity of the battery is insufficient due to, for example, degradation of the battery. For example, when the output voltage is decreased to an extent such that the relation between a pressure and flow rate of secondary air, shown in FIG. 2, is not maintained, it may be not possible to supply secondary air with a desired accuracy. Therefore, when the output voltage of the battery is lower than a preset determination value, it may be determined that the condition for supplying secondary air is not satisfied.

Furthermore, any condition, such as a duration during which secondary air is supplied in the case where AI has been already executed, an accumulated amount of air supplied into the engine exhaust passage and whether the secondary air supply system is normal, may be employed as the condition for executing AI. For example, when the duration during which secondary air is supplied is longer than a preset determination period of time, in order to stop the secondary air supply system, it may be determined that the condition for executing AI is not satisfied.

In step 100, when the condition for executing AI is not satisfied, the process proceeds to step 117. In this case, control for prohibiting flow rate estimating control is executed. In step 117, the control valve V0 is closed. When the control valve V0 has been already closed, the closed state is kept.

Subsequently, in step 118, it is determined whether a predetermined period of time has elapsed from when the control valve V0 is closed. The predetermined period of time may be a period of time that is required for the electric air pump to stably operate after the control valve is closed. In step 118, it is determined whether the electric air pump is in a stable operating state after the control valve V0 is closed. When the predetermined period of time has elapsed from when the control valve V0 is closed in step 118, the process proceeds to step 119. In step 119, the electric air pump is stopped. In step 118, when the predetermined period of time has not elapsed from when the control valve V0 is closed, the current control is ended.

In step 100, when the condition for executing AI is satisfied, the process proceeds to step 101. In step 101, the control valve V0 is closed. When the control valve V0 has been already closed, the closed state is kept.

In step 102, the electric air pump is operated. When the electric air pump is stopped, the electric air pump is started. When the electric air pump has been already operating, the operation of the electric air pump is continued.

In step 103, it is determined whether a preset period of time has elapsed from a start of the electric air pump. In step 103, for example, in the time chart shown in FIG. 5, it is determined whether time tx at which the first pressure Pjam should be detected has been reached. In the present embodiment, the timing at which the first pressure Pjam is detected is set to timing immediately before the control valve V0 is opened. By detecting the first pressure Pjam immediately before the control valve V0 is opened, the first pressure Pjam is made close to a value in a steady state. Therefore, it is possible to reduce a correction amount by which the first pressure Pjam is corrected. Therefore, it is possible to reduce an error that finally arises.

In step 103, when the preset period of time has not elapsed from a start of the electric air pump, the current control is ended. In step 103, when the preset period of time has elapsed from a start of the electric air pump, the process proceeds to step 104. In step 104, the first pressure Pjam that is a pressure at the time of valve shutoff operation is detected. As shown in FIG. 1, it is possible to detect the first pressure Pjam with the use of the pressure sensor 33. In step 105, substantially simultaneously with detection of the first pressure Pjam, the driving voltage that is supplied to the electric air pump is detected. As shown in FIG. 4, in the present embodiment, the voltage V(Pjam) of the battery 61 is detected by the voltage sensor 63. In the present embodiment, the driving voltage that is supplied to the electric air pump at the time when the first pressure is detected is termed first driving voltage.

Subsequently, in step 106, the control valve V0 is opened. In addition, the control valves V1 and V2 are opened. By opening the control valves V0, V1 and V2, it is possible to supply secondary air into the engine exhaust passage. In the present embodiment, the control valves V0, V1 and V2 are fully open; however, the invention is not limited to this configuration. Instead, the control valves V0, V1 and V2 may be opened at a preset opening degree.

Subsequently, in step 107, it is determined whether the preset period of time has elapsed from when the control valve V0 is opened. As shown in FIG. 5, in step 107, it is determined whether time ty at which the second pressure Pon should be detected has been reached. The preset period of time may be a period of time after the control valve V0 is opened until the secondary air supply system is placed in a steady state where the pressure in the secondary air supply pipe is substantially constant.

In step 107 in the present embodiment, it is determined whether the preset period of time has elapsed after the control valve V0 is opened; however, the invention is not limited to this configuration. Instead, in step 107, it may be determined whether the pressure in the secondary air supply pipe is substantially constant. For example, it may be determined whether the secondary air supply system is in a steady state where the driving voltage that is supplied to the electric air pump is substantially constant.

In step 107, when the preset period of time has elapsed from when the control valve V0 is opened, the process proceeds to step 108. When the preset period of time has not elapsed from when the control valve V0 is opened in step 107, the current control is ended.

In step 108, the second pressure Pon is detected. As shown in FIG. 1, it is possible to detect the second pressure Pan with the use of the pressure sensor 33. In step 109, substantially simultaneously with detection of the second pressure Pon, the driving voltage that is supplied to the electric air pump is detected. As shown in FIG. 4, in the present embodiment, the output voltage V(Pon) of the battery 61 is detected by the voltage sensor 63. In the present embodiment, the driving voltage that is supplied to the electric air pump at the time when the second pressure is detected is termed second driving voltage.

Subsequently, in step 110, the first pressure Pjam detected in step 104 is corrected, and the corrected first pressure Pjam is calculated.

Figure 7:
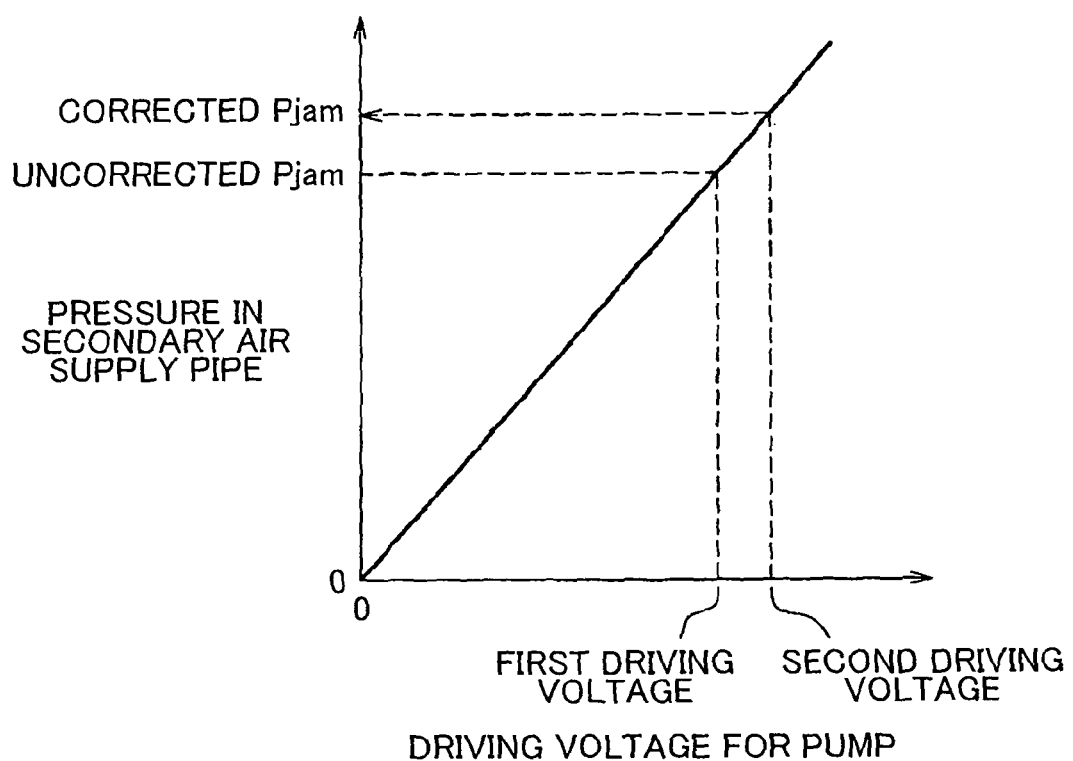
FIG. 7 is a graph that illustrates the relation between a driving voltage for an electric air pump and a pressure in the secondary air supply pipe according to the first embodiment.

FIG. 7 shows a graph that illustrates the relation between a driving voltage for the electric air pump and a pressure in the secondary air supply pipe in the secondary air supply system according to the present embodiment. As the driving voltage for the electric air pump increases, the pressure inside the secondary air supply pipe increases. In the present embodiment, the corrected first pressure Pjam is calculated on the assumption that the driving voltage for the electric air pump and the pressure inside the secondary air supply pipe are directly proportional to each other. The first pressure Pjam is corrected on the basis of the ratio between the driving voltage at the time when the first pressure Pjam is detected and the driving voltage at the time when the second pressure Pon is detected. It is possible to calculate the corrected first pressure Pjam in the present embodiment by the following mathematical expression (1).

(Corrected first pressure $P$jam)=(Uncorrected first pressure $P$jam)×(Second driving voltage)/(First driving voltage)     (1)

In this way, it is possible to correct the first pressure on the basis of the first driving voltage for the electric air pump at the time when the first pressure is detected and the second driving voltage for the electric air pump at the time when the second pressure is detected. When the first pressure is detected in a transitional state as well, it is possible to estimate the first pressure in a steady state.

In the present embodiment, the first pressure Pjam is corrected on the assumption that the driving voltage for the electric air pump and the pressure in the secondary air supply pipe are directly proportional to each other; however, the invention is not limited to this configuration. The first pressure Pjam may be corrected by a selected method. For example, the graph shown in FIG. 7 shows the relation of a straight line that passes through an origin; however, the invention is not limited to this configuration. Instead, the relation of a curve may be employed. Alternatively, correction of the first pressure is not limited to the estimating method through calculation. For example, a map of a corrected first pressure as a function of an uncorrected first pressure, a driving voltage at the time when the first pressure is detected and a driving voltage at the time when the second pressure is detected may be stored in the electronic control unit in advance. In this way, the first pressure may be corrected with the use of the preset map.

As shown in FIG. 6B, subsequently, in step 111, an actual secondary air flow rate Qjam is estimated on the basis of the corrected first pressure Pjam and the detected second pressure Pon.

Figure 8:
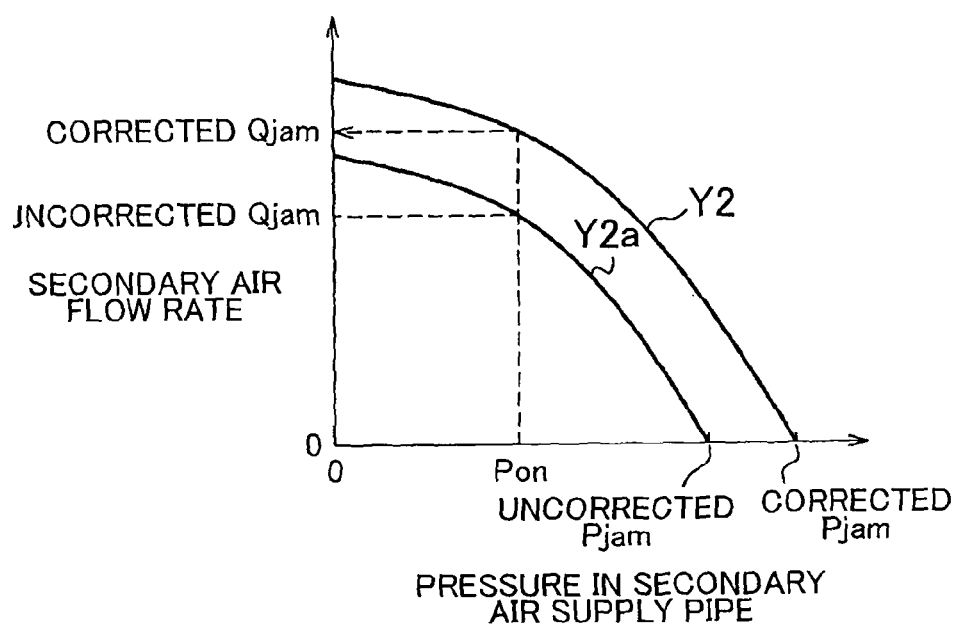
FIG. 8 is a graph that illustrates the relation between a pressure and a secondary air flow rate in the secondary air supply pipe of the secondary air supply system according to the first embodiment.

FIG. 8 shows a graph that illustrates the relation between a pressure in the secondary air supply pipe and a secondary air flow rate. FIG. 8 is obtained by applying the graph shown in FIG. 2 to the flow rate estimating control according to the present embodiment. It is possible to set a characteristic curve Y2 by using the corrected first pressure Pjam. By applying the detected second pressure Pon to the characteristic curve Y2, it is possible to estimate a corrected secondary air flow rate Qjam.

FIG. 8 shows a characteristic curve Y2a corresponding to an uncorrected first pressure Pjam. When the uncorrected first pressure Pjam is used, an uncorrected secondary air flow rate Qjam is smaller than an actual flow rate. That is, an estimated secondary air flow rate becomes smaller. By using the corrected first pressure Pjam, it is possible to further accurately estimate the secondary air flow rate. Note that the secondary air flow rate may be, for example, estimated by using the map shown in FIG. 3.

As shown in FIG. 6B, subsequently, in the flow rate estimating control according to the present embodiment, after the secondary air flow rate is estimated, it is determined whether the secondary air flow rate is normal.

In step 112, it is determined whether the estimated secondary air flow rate Qjam is larger than a preset determination flow rate Q0. When the estimated secondary air flow rate Qjam is larger than the preset determination flow rate Q0, the process proceeds to step 113. In step 113, it is determined that air is supplied into the engine exhaust passage at a desired flow rate. That is, it is determined that the secondary air flow rate is normal.

When the estimated secondary air flow rate Qjam is smaller than or equal to the preset determination flow rate Q0 in step 112, the process proceeds to step 114. In step 114, it is determined that the secondary air flow rate is decreased. When it is determined that the secondary air flow rate is decreased, for example, it is possible to extend the period of time during which secondary air is supplied, stop supply of secondary air or notify a driver of an abnormality of the secondary air supply system through an alarm lamp, or the like.

In this way, in the flow rate estimating control according to the present embodiment, the first pressure is corrected on the basis of the first driving voltage for the electric air pump in the first operating state, that is, a valve shutoff operation state, and the second driving voltage for the electric air pump in the second operating state, that is, an operating state where secondary air is supplied into the engine exhaust passage. The secondary air flow rate is estimated on the basis of the corrected first pressure. Through this control, it is possible to reduce an error of the secondary air flow rate that is dependent on the driving voltage for the electric air pump. It is possible to further accurately estimate the secondary air flow rate.

In the present embodiment, the flow rate estimating control immediately after the secondary air supply system is started is described; however, the invention is not limited to this configuration. Instead, the invention is applicable to any secondary air supply system that operates in a manner in which the driving voltage supplied to the electric air pump at the time when the first pressure is detected differs from the driving voltage supplied to the electric air pump at the time when the second pressure is detected.

In the present embodiment, the first pressure Pjam is corrected because the operating state at the time when the first pressure Pjam is detected is a transitional state; however, the invention is not limited to this configuration. Instead, the second pressure Pon may be corrected on the basis of the first driving voltage and second driving voltage for the electric air pump. For example, when the driving voltage for the electric air pump at the time when the second pressure Pon is detected is different from a rated voltage, the second pressure Pon may be corrected. Alternatively, both the first pressure Pjam and the second pressure Pon may be corrected on the basis of the first driving voltage and second driving voltage for the electric air pump.

In the present embodiment, the first driving voltage is detected by the voltage sensor at the time when the first pressure is detected, and the second driving voltage is detected by the voltage sensor at the time when the second pressure is detected. That is, when each of the pressures is measured, an actual driving voltage that is supplied to the electric air pump is detected. By actually measuring the respective driving voltages, it is possible to accurately estimate the secondary air flow rate.

With regard to the driving voltages of the electric air pump at the time when the respective pressures are detected, the invention is not limited to this configuration. The first driving voltage or the second driving voltage may be set in advance. For example, the first driving voltage may be detected by the voltage sensor at the time when the first pressure is detected, and the second driving voltage at the time when the second pressure is detected may be set to a preset reference driving voltage.

As shown in FIG. 5, for example, at time ty at which the second pressure Pon is detected in the second operating state, the driving voltage for the electric air pump is substantially constant. Therefore, when it is possible to estimate the driving voltage for the electric air pump in advance, a reference driving voltage may be set in advance as the driving voltage for the electric air pump at the time when the pressure is detected. The reference driving voltage may be stored in the electronic control unit. In the flow rate estimating control, the reference driving voltage stored in the electronic control unit may be loaded.

The reference driving voltage is not limited to a fixed value. For example, a variable value as a function of the state of the internal combustion engine, such as a travel distance, may be employed as the reference driving voltage. For example, the reference driving voltage may gradually decrease due to increase in a travel distance of the vehicle, or aging degradation of the electric air pump. In consideration of these states of the internal combustion engine, for example, a value of the reference driving voltage as a function of a travel distance of the vehicle may be stored in the electronic control unit in advance. The reference driving voltage may be set on the basis of a travel distance of the vehicle.

As will be described in a second embodiment, for example, when an electrical load device that is a large electrical load other than the electric air pump is connected to the battery that supplies electric power to the electric air pump, the reference driving voltage may be set on the basis of an operation state of the electrical load device.

The internal combustion engine according to the present embodiment is a multi-cylinder V-type gasoline engine that is divided into right and left banks; however, the invention is not limited to this configuration. The secondary air supply system according to the invention is applicable to any internal combustion engine.

Figure 9:
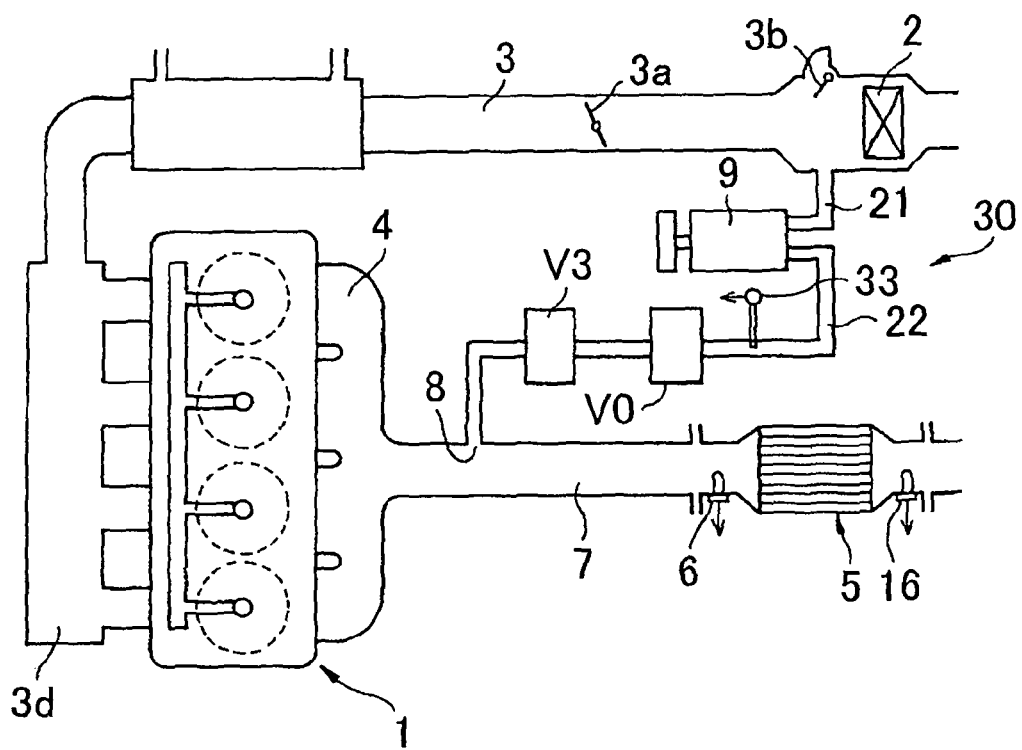
FIG. 9 is a schematic view of another internal combustion engine according to the first embodiment.

FIG. 9 is a schematic view of another internal combustion engine for which the secondary air supply system according to the invention is mountable. The internal combustion engine is an in-line engine in which cylinders are arranged in line. An intake manifold 3d that extends from the intake pipe 3 is connected to one side of the engine body 1, and an exhaust manifold 4 is connected to the other side of the engine body 1.

The secondary air supply system 30 includes the air intake pipe 21, the electric air pump 9 and the secondary air supply pipe 22. The pressure sensor 33 and the control valve V0 are provided in the secondary air supply pipe 22 in the stated order from the upstream side. A control valve V3 is provided in the secondary air supply pipe 22 at a portion downstream of the control valve V0. The secondary air supply pipe 22 is connected to an exhaust pipe 7. A catalytic converter 5 is arranged in the exhaust pipe 7. A catalyst having an oxidation function is supported in the catalytic converter 5. $O_2$ sensors 6 and 16 are respectively provided upstream and downstream of the catalytic converter 5. In FIG. 9, for the sake of easy illustration, the electronic control unit 40 is omitted.

For the internal combustion engine configured as shown in FIG. 9 as well, by operating the electric air pump 9 in a state where the downstream-side control valve V3 is opened while the upstream-side control valve V0 is closed, it is possible to detect the first pressure Pjam that is the pressure at the time of valve shutoff operation. In addition, by operating the electric air pump 9 in a state where the downstream-side control valve V3 and the upstream-side control valve V0 are open, it is possible to detect the second pressure Pon that is the pressure at the time of execution of AI. In the case of the above configured internal combustion engine as well, it is possible to accurately estimate an actual flow rate Qjam at the time of execution of AI by executing the flow rate estimating control in the present embodiment.

In the present embodiment, the description is made on the example at the time of a start of the internal combustion engine; however, the invention is not limited to this configuration. Instead, the invention is also applicable to a period during which the internal combustion engine is continuously operating. In the present embodiment, the first pressure at the time of valve shutoff operation is detected before the second pressure at the time of execution of AI is detected; however, the invention is not limited to this configuration. The second pressure may be detected first.

Second Embodiment

A secondary air supply system for an internal combustion engine according to a second embodiment will be described with reference to FIG. 10 to FIG. 12. The configuration of the internal combustion engine according to the present embodiment is the same as the configuration of the internal combustion engine according to the first embodiment (see FIG. 1).

In the present embodiment, the case where an electrical load device that is connected to the battery that serves as the storage battery is started or stopped immediately before flow rate estimating control for estimating the secondary air flow rate is executed or during a period in which flow rate estimating control is being executed will be described.

As shown in FIG. 1 and FIG. 4, the plurality of electrical load devices 64 and 65 are arranged in the vehicle according to the present embodiment. Among the plurality of electrical load devices, the electrical load device 64 has a large power consumption and has a characteristic that the output voltage of the battery 61 is decreased when the electrical load device 64 operates. When the electrical load device 64 is stopped, the output voltage of the battery 61 is increased. In the present embodiment, a device, which has a large load, and whose operation causes the output voltage of the battery 61 to fluctuate, is termed specific electrical load device. In the present embodiment, the electrical load device 64 may be regarded as the specific electrical load device.

The electrical load device having a large electrical load may be, for example, a hydraulic fluid pressure pump that supplies air, hydraulic fluid, or the like, having a predetermined pressure to a suspension device (suspension) that supports a wheel. In addition, the electrical load device may be a pressure pump that supplies hydraulic fluid having a predetermined pressure to a braking device (brake). Furthermore, the electrical load device may be an electrical heating catalyst that is arranged in the exhaust gas control system. At the time of a start of the internal combustion engine, by energizing the electrical heating catalyst, it is possible to increase the temperature of the exhaust gas purification catalyst to at or above the activation temperature in a short period of time.

When the electrical load device 64 operates and the output voltage of the battery 61 decreases, the driving voltage that is supplied to the electric air pump 9 of the secondary air supply system also decreases. The discharge capacity of the electric air pump 9 decreases, and the pressure in the secondary air supply pipe 22 also decreases. In the present embodiment, flow rate estimating control over the secondary air supply system in the vehicle that includes an electrical load device that influences the output voltage of the battery 61 will be described.

In the flow rate estimating control according to the present embodiment as well, the first pressure Pjam is detected as the pressure at the time of valve shutoff operation, and the second pressure Pon is detected as the pressure at the time when secondary air is supplied into the engine exhaust passage. There is a case where the output voltage of the battery 61 changes due to the operation state of the electrical load device 64 and then the driving voltage for the electric air pump 9 at the time when the first pressure Pjam is detected and the driving voltage for the electric air pump 9 at the time when the second pressure Pon is detected differ from each other. Due to the change in the driving voltage for the electric air pump 9, the pressure in the secondary air supply pipe changes.

Figure 10:
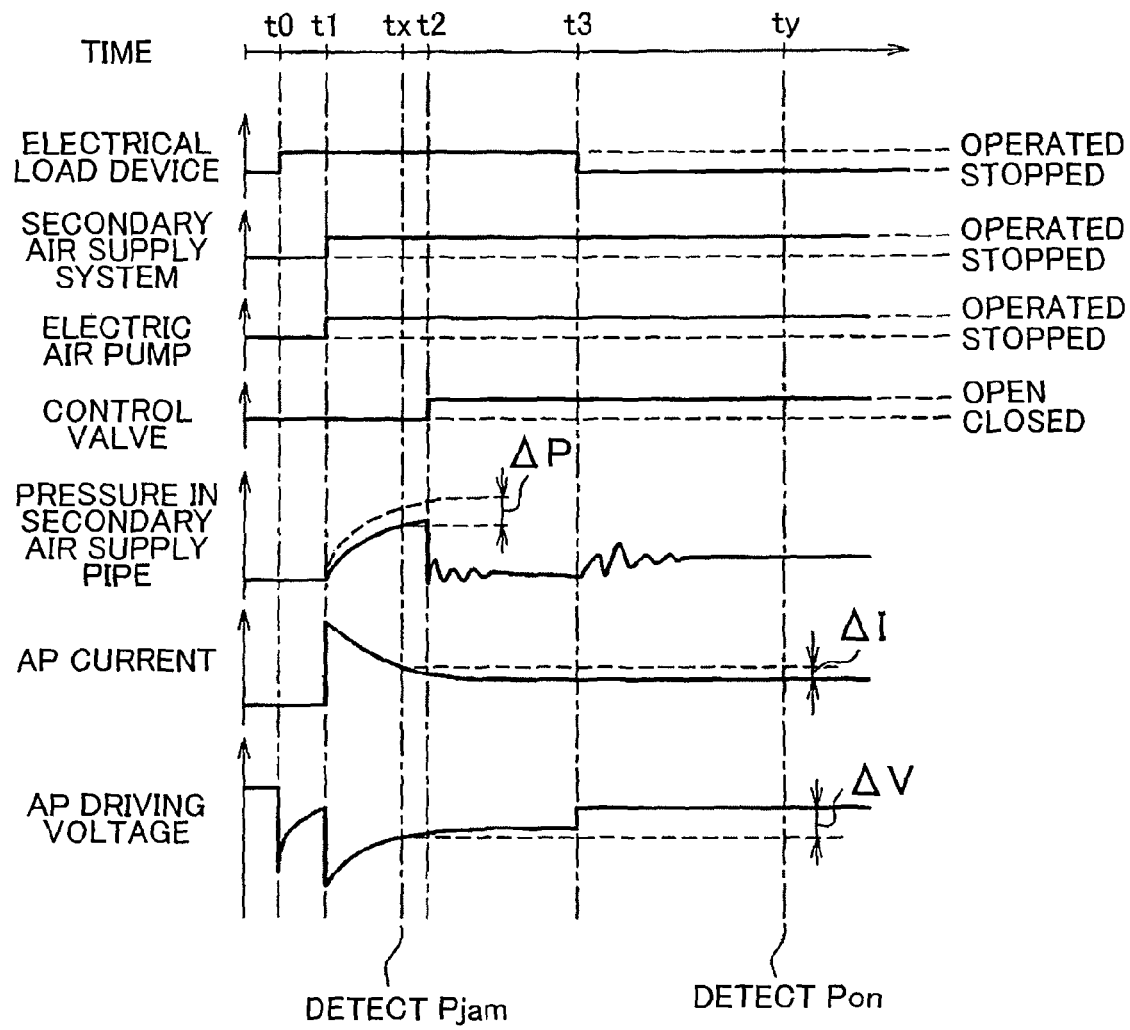
FIG. 10 is a time chart at the time when the secondary air supply system is started according to a second embodiment.

FIG. 10 shows a time chart of an operation example of the internal combustion engine in the present embodiment. As in the case of the operation example shown in FIG. 1 of the first embodiment, the secondary air supply system is started at time t1, and the control valves V0, V1 and V2 are opened at time t2. Furthermore, the first pressure Pjam is detected at time tx immediately before the control valves V0, V1 and V2 are opened. The second pressure Pon is detected at time ty at which the secondary air supply system is in a steady state, as in the case of the first embodiment.

In the operation example according to the present embodiment, the operation state of the electrical load device 64 that influences the output voltage of the battery is changed immediately before the secondary air supply system is started and during a period in which the secondary air supply system is operating. The electrical load device 64 is started at time t0 prior to time t1, and is stopped at time t3 between time t2 and time ty.

The driving voltage for the electric air pump 9 fluctuates due to the operation of the electrical load device 64. At time t0, because the electrical load device 64 is started, the output voltage of the battery 61 is sharply decreased. After that, the output voltage of the battery 61 gradually increases. However, at time t1, the electric air pump 9 is started, so the driving voltage decreases again. After that, the driving voltage for the electric air pump gradually increases. By opening the control valve at time t2, the pressure inside the secondary air supply pipe decreases. After that, at time t3, the electrical load device 64 is stopped, so the driving voltage for the electric air pump 9 increases. In this way, as the electrical load device 64 is started, the driving voltage for the electric air pump 9 decreases; whereas, as the electrical load device 64 is stopped, the driving voltage for the electric air pump 9 increases.

At time tx at which the first pressure is detected, the secondary air supply system is in a transitional state where the driving voltage for the electric air pump 9 is increased due to the influence of a start of the electrical load device 64 and a start of the electric air pump 9. At time ty at which the second pressure is detected, the electrical load device 64 is stopped. Therefore, there is a voltage difference ΔV between the driving voltage for the electric air pump 9 at time tx at which the first pressure is detected and the driving voltage for the electric air pump 9 at time ty at which the second pressure is detected. At time tx, the pressure in the secondary air supply pipe is increasing, and it is in a transitional state. There is a pressure difference ΔP between the pressure in the secondary air supply pipe at time tx and the pressure at the time when the pressure in the secondary air supply pipe is in a steady state in the first operating state.

In the secondary air supply system according to the present embodiment as well, it is possible to execute control similar to the flow rate estimating control shown in FIGS. 6A and 6B according to the first embodiment. That is, it is possible to correct the first pressure on the basis of the first driving voltage for the electric air pump at the time when the first pressure is detected and the second driving voltage for the electric air pump at the time when the second pressure is detected. It is possible to estimate the secondary air flow rate using the corrected first pressure. Furthermore, in the present embodiment, control based on the operation state of the electrical load device is added to the flow rate estimating control according to the first embodiment.

Figure 11A:
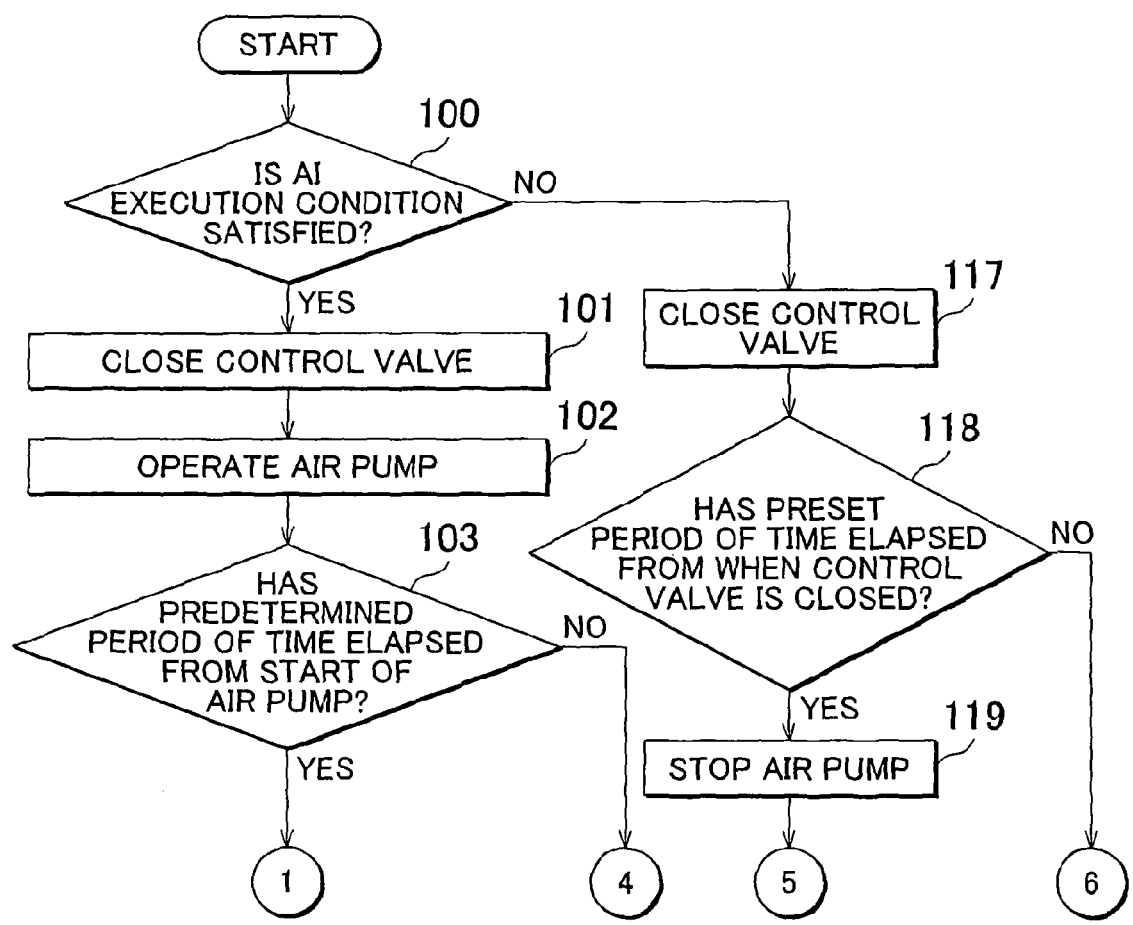
FIGS. 11A and 11B show a flowchart of flow rate estimating control that is executed in the secondary air supply system according to the second embodiment.
Figure 11B:
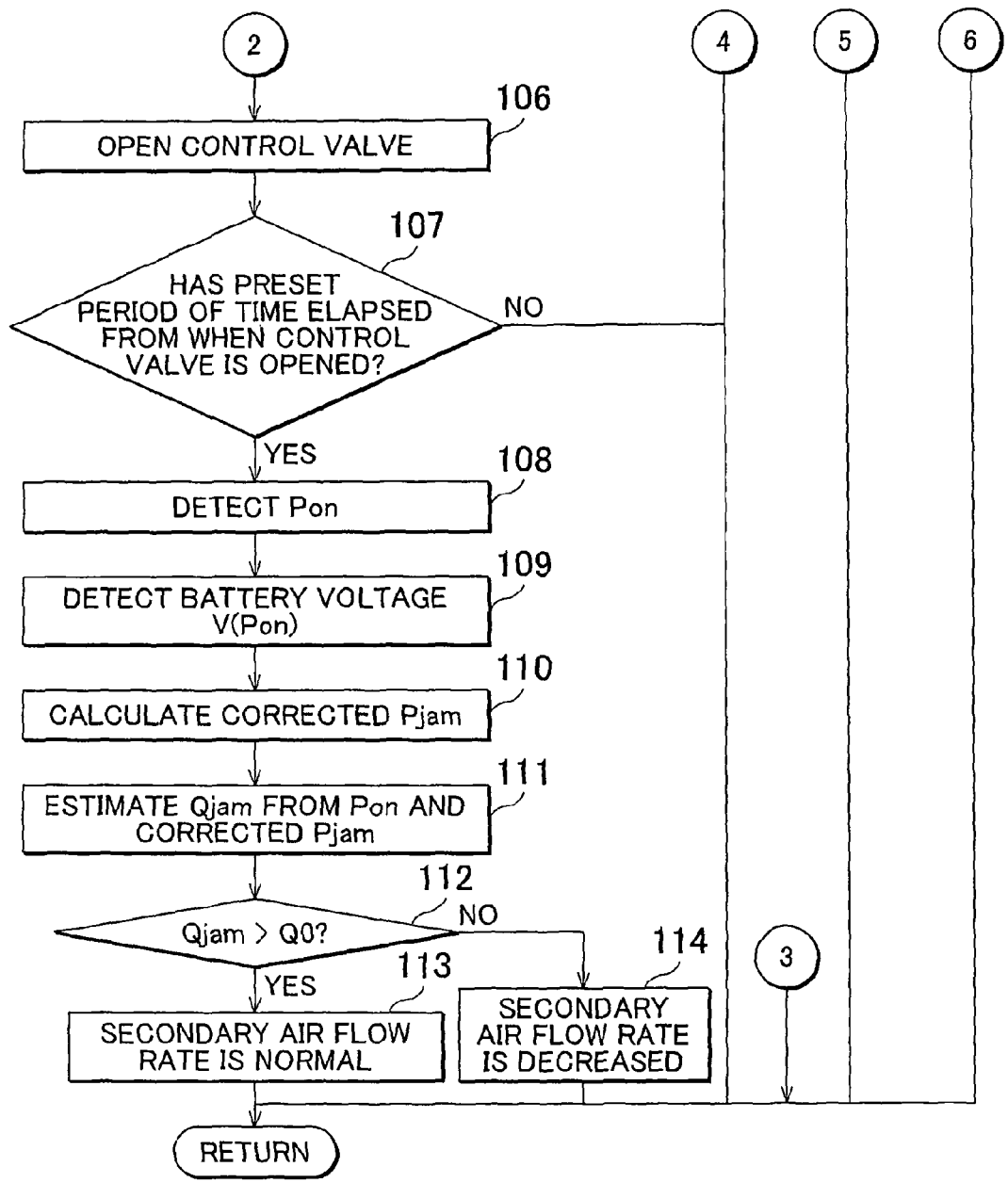
Figure 12:
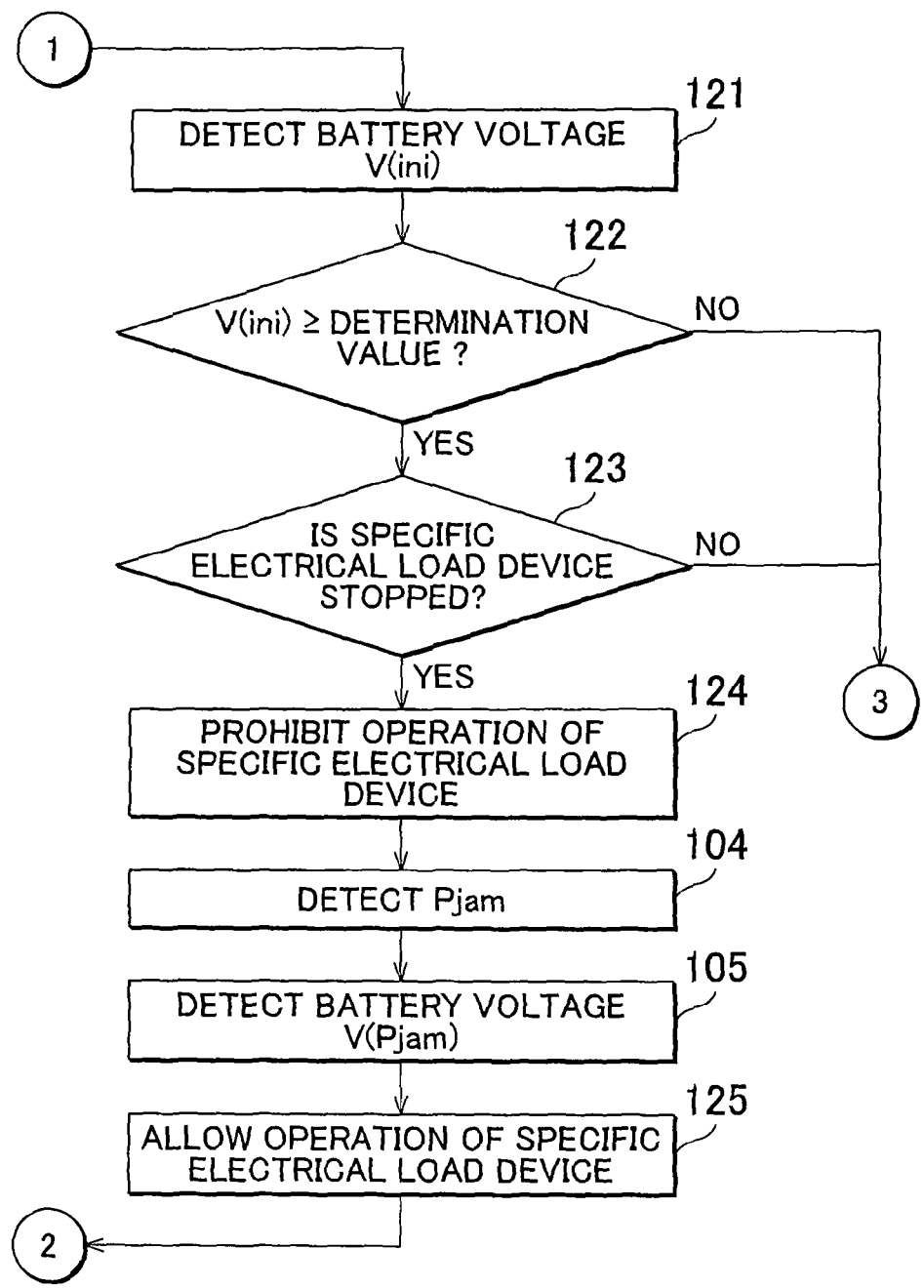
FIG. 12 shows the flowchart of the flow rate estimating control that is executed in the secondary air supply system according to the second embodiment.

FIGS. 11A and 11B and FIG. 12 show a flowchart of an example of flow rate estimating control according to the present embodiment. Step 100 to step 103, and step 117 to step 119 are the same as those of the flow rate estimating control shown in FIGS. 6A and 6B according to the first embodiment.

As shown in FIGS. 11A and 11B and FIG. 12, in the present embodiment, when it is determined in step 103 that the preset period of time has elapsed from a start of the electric air pump, the process proceeds to step 121. At this time, the secondary air supply system is the first operating state where the control valve V0 is closed.

In step 121, the voltage V(ini) of the battery is detected. That is, the driving voltage for the electric air pump is detected. In step 122, it is determined whether the voltage V(ini) of the battery is higher than or equal to a preset determination value. In step 122, the electric power supply capacity of the battery in the first operating state is determined. Since the voltage V(ini) is detected in the first operating state, the voltage V(ini) may be regarded as the first driving voltage according to the invention.

When the voltage of the battery is lower than the determination value in step 122, the current control is ended. This case includes the case where the battery itself is degraded and the case where the specific electrical load device having a large load is operating. When the specific electrical load device is operating, it is possible to estimate the secondary air flow rate after a stop of the specific electrical load device in the next or later flow rate estimating control. When the battery itself is degraded, the flow rate estimating control is not executed. That is, control for prohibiting the flow rate estimating control is executed. When the voltage of the battery is higher than or equal to the determination value in step 122, the process proceeds to step 123.

In step 123, it is determined whether the specific electrical load device is stopped. An electrical load device, which has a large load, and whose operation causes the output voltage of the battery to decrease, may be selected in advance as the specific electrical load device that is used to make determination in step 123. The specific electrical load device that is used to make determination in step 123 may be one or may be plural.

When the specific electrical load device is operating in step 123, the current control is ended. In this case, for example, because the electrical load device having a large load is operating, a correction amount, by which the pressure in the secondary air supply pipe is corrected, increases as a result of a decrease in the output voltage of the battery. There is a case where an error included in the estimated secondary air flow rate is relatively large. Therefore, in the present embodiment, control for prohibiting the flow rate estimating control for estimating secondary air is executed. Note that, even when the specific electrical load device is operating, the flow rate estimating control may be executed. In this case, as in the case of the first embodiment, it is possible to detect the first pressure and the first driving voltage.

When the specific electrical load device is stopped in step 123, the process proceeds to step 124. In step 124, control for prohibiting the operation of the specific electrical load device that influences the output voltage of the battery is executed. That is, control for maintaining the specific electrical load device in a stop state is executed.

Subsequently, in step 104 and step 105, the first pressure Pjam is detected, and the voltage V(Pjam) of the battery is detected. In this way, it is possible to detect the first pressure and the first driving voltage for the electric air pump in a state where the electrical load device that influences the output voltage of the battery is stopped.

After that, in step 125, the operation of the specific electrical load device is allowed. When the operation of the specific electrical load device is required, the specific electrical load device is started. After that, step 106 to step 114 are the same as those of the flow rate estimating control shown in FIGS. 6A and 6B according to the first embodiment.

In the present embodiment, in the case where the specific electrical load device is operating, the first driving voltage in the first operating state is detected, and, when the first driving voltage is lower than the preset determination value, control is executed to prohibit detection of the first pressure during a period in which the specific electrical load device is operating. Through this control, it is possible to detect the first pressure in a state where the specific electrical load device is stopped. Thus, it is possible to suppress a decrease in the pressure in the secondary air supply pipe due to a decrease in the supply voltage of the battery. Therefore, it is possible to reduce the correction amount by which the detected pressure in the secondary air supply pipe is corrected. As a result, it is possible to more accurately estimate the secondary air flow rate.

In the flow rate estimating control according to the present embodiment, the operation state of the specific electrical load device that influences the driving voltage for the electric air pump is detected, and, when the specific electrical load device is operating, control for prohibiting detection of the first pressure is executed. Through this control, it is possible to detect the first pressure and the first driving voltage while avoiding a period during which the specific electrical load device is operating. For example, it is possible to detect the first pressure after the specific electrical load device is stopped. In addition, it is possible to suppress an increase in an error of the estimated secondary air flow rate due to an increase in the correction amount by which the first pressure is corrected.

In the flow rate estimating control according to the present embodiment, the operation state of the specific electrical load device is detected at the time when the first pressure should be detected in the first operating state, and, when the specific electrical load device is stopped, control for prohibiting the operation of the specific electrical load device until an end of detection of the first pressure is executed. Through this control, it is possible to detect the first pressure in a state where the specific electrical load device is stopped. For example, it is possible to avoid a situation that the specific electrical load device is started immediately before the first pressure is detected and then the driving voltage for the electric air pump decreases. It is possible to avoid a decrease in the pressure in the secondary air supply pipe due to a decrease in the driving voltage for the electric air pump, so it is possible to improve the accuracy of estimating the secondary air flow rate.

In the operation example according to the present embodiment, the specific electrical load device is started before supply of secondary air and then the specific electrical load device is stopped after the control valve is opened; however, the invention is not limited to this configuration. The invention is also applicable to the case where the specific electrical load device is started or stopped at selected timing. For example, the timing at which the specific electrical load device is stopped may be later than time ty at which the second pressure Pon is detected. In addition, the timing at which the specific electrical load device is started may be in a period from time t1 to time tx, during which the secondary air supply system is started and the pressure in the secondary air supply pipe is increasing. In any case, it is possible to estimate the secondary air flow rate through the flow rate estimating control according to the present embodiment.

The internal combustion engine according to the present embodiment is a V-type engine (see FIG. 1), and the engine exhaust passage is divided into two lines. The secondary air supply system may be separately arranged in each of the lines of the engine exhaust passage. For example, a control valve and an electric air pump may be arranged in one line, and another control valve and another electric air pump may be arranged in the other line. For example, the configuration may be such that the flow rate estimating control according to the present embodiment is executed in one line and, in addition, the flow rate estimating control according to the present embodiment is executed in the other line independently of the one line.

The two electric air pumps are respectively provided in the above secondary air supply systems for an internal combustion engine. When the two electric air pumps are started simultaneously, the output voltage of the battery significantly decreases and, as a result, the electronic control unit may stop automatically. In order to avoid an automatic stop of the electronic control unit, when the plurality of electric air pumps are started in the secondary air supply systems, control is executed to make the timings of starting the electric air pumps different from each other.

However, when the timing at which secondary air is supplied into the engine exhaust passage is delayed, a period of time during which exhaust gas property is deteriorated extends. Therefore, a period of time between the timings, at which the electric air pumps are started, is set to a minimum period of time that does not cause an automatic stop of the electronic control unit. Thus, the plurality of electric air pumps are started intermittently in a short period of time. For example, one of the electric air pumps is started, and, immediately, the other one of the electric air pumps is started. When the other one of the electric air pumps is started, there arises an influence on the driving voltage for the one of the electric air pumps. The flow rate estimating control for estimating secondary air according to the present embodiment may also be applied to the secondary air supply systems that have such a plurality of lines.

Note that, when the preset reference driving voltage is used as the driving voltage for the electric air pump at the time when the pressure inside the secondary air supply pipe is detected, it may be determined whether the specific electrical load device is operating, and then control for changing the reference driving voltage may be executed. The driving voltage for the electric air pump at the time when the specific electrical load device is operating may be set as the reference driving voltage in advance. For example, the reference driving voltage in a period during which the specific electrical load device that influences the output voltage of the battery is operating may be set so as to be lower than the reference driving voltage in a period during which the specific electrical load device is stopped.

Other components, operations and advantageous effects are similar to those of the first embodiment, so the description is not repeated here.

The above-described embodiments may be combined together as needed. In each of the above-described controls, the sequence of steps may be changed as needed within the scope in which it is possible to achieve the operations and functions. In each of the above-described drawings, like reference numerals denote the same or corresponding portions. Note that the above-described embodiments are only illustrative and are not intended to limit the invention. In addition, in the embodiments, changes described in the appended claims are included.

The invention claimed is:

1. A secondary air supply system for an internal combustion engine, the secondary air supply system comprising:
    a secondary air supply passage through which secondary air is supplied to a location upstream of an exhaust gas purification catalyst arranged in an exhaust passage of the internal combustion engine;
    an electric air pump that supplies secondary air into the secondary air supply passage;
    a control valve provided downstream of the electric air pump to open and close the secondary air supply passage;
    a pressure detector that measures a pressure in the secondary air supply passage at a location between the electric air pump and the control valve;
    a voltage detector that detects a driving voltage supplied to the electric air pump; and
    an electronic control unit that is configured to detect a first pressure in the secondary air supply passage using the pressure detector in a first operating state where the control valve is closed and the electric air pump is operating, to detect a second pressure in the secondary air supply passage using the pressure detector in a second operating state where the control valve is open and the electric air pump is operating, and to execute flow rate estimating control for estimating a secondary air flow rate at which secondary air flows through the secondary air supply passage in the second operating state on the basis of the first pressure and the second pressure, wherein in the flow rate estimating control, the electronic control unit corrects at least one of the first pressure and the second pressure on the basis of a first driving voltage for the electric air pump in the first operating state and a second driving voltage for the electric air pump in the second operating state, and estimates the secondary air flow rate on the basis of the first pressure and the second pressure at least one of which has been corrected, and wherein the electronic control unit detects the first driving voltage and the second driving voltage using the voltage detector or detects the first driving voltage using the voltage detector and uses a preset reference driving voltage as the second driving voltage.

2. The secondary air supply system according to claim 1, wherein the electronic control unit detects the first driving voltage and the second driving voltage using the voltage detector.

3. The secondary air supply system according to claim 1, wherein the electronic control unit detects the first driving voltage using the voltage detector and uses the preset reference driving voltage as the second driving voltage.

4. The secondary air supply system according to claim 1, wherein, when the first driving voltage supplied to the electric air pump in the first operating state is lower than a preset determination value, the electronic control unit prohibits the flow rate estimating control.

5. The secondary air supply system according to claim 1, wherein:
   the secondary air supply system is arranged in a vehicle that includes a storage battery that supplies electric power to the electric air pump and an electrical load device that is connected to the storage battery;
   the electrical load device has a characteristic that the driving voltage for the electric air pump is decreased when the electrical load device operates; and
   the electronic control unit detects the first driving voltage in the first operating state in a period during which the electrical load device is operating, and when the first driving voltage is lower than a preset determination value, the electronic control unit prohibits detection of the first pressure in the period during which the electrical load device is operating.

6. The secondary air supply system according to claim 1, wherein:
   the secondary air supply system is arranged in a vehicle that includes a storage battery that supplies electric power to the electric air pump and an electrical load device that is connected to the storage battery;
   the electrical load device has a characteristic that the driving voltage for the electric air pump is decreased when the electrical load device operates; and
   the electronic control unit detects an operation state of the electrical load device, and when the electrical load device is operating, the electronic control unit prohibits detection of the first pressure.

7. The secondary air supply system according to claim 1, wherein:
   the secondary air supply system is arranged in a vehicle that includes a storage battery that supplies electric power to the electric air pump and an electrical load device that is connected to the storage battery;
   the electrical load device has a characteristic that the driving voltage for the electric air pump is decreased when the electrical load device operates; and
   the electronic control unit detects an operation state of the electrical load device when the first pressure should be detected, and when the electrical load device is stopped, the electronic control unit prohibits operation of the electrical load device until an end of detection of the first pressure.

8. The secondary air supply system according to claim 1, wherein the electronic control unit detects the first driving voltage using the voltage detector at a time when the first pressure is detected, and detects the second driving voltage using the voltage detector at a time when the second pressure is detected.

9. The secondary air supply system according to claim 8, wherein the electronic control unit corrects the first pressure on the basis of a ratio between the first driving voltage detected at the time when the first pressure is detected and the second driving voltage detected at the time when the second pressure is detected.

* * * * *